US012704672B2

(12) United States Patent
Hayashi

(10) Patent No.: US 12,704,672 B2
(45) Date of Patent: Aug. 11, 2026

(54) POLARIZATION MAINTAINING OPTICAL FIBER AND POLARIZATION MAINTAINING OPTICAL FIBER MANUFACTURING METHOD

(71) Applicant: SUMITOMO ELECTRIC INDUSTRIES, LTD., Osaka (JP)

(72) Inventor: Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 339 days.

(21) Appl. No.: 18/272,607

(22) PCT Filed: Feb. 8, 2022

(86) PCT No.: PCT/JP2022/004871

§ 371 (c)(1),
(2) Date: Jul. 17, 2023

(87) PCT Pub. No.: WO2022/172910

PCT Pub. Date: Aug. 18, 2022

(65) Prior Publication Data

US 2024/0085618 A1 Mar. 14, 2024

(30) Foreign Application Priority Data

Feb. 12, 2021 (JP) ................................ 2021-020621

(51) Int. Cl.
*G02B 6/024* (2006.01)
*C03B 37/012* (2006.01)
(Continued)

(52) U.S. Cl.
CPC ........ *G02B 6/024* (2013.01); *C03B 37/01217* (2013.01); *C03B 37/01231* (2013.01);
(Continued)

(58) Field of Classification Search
None
See application file for complete search history.

(56) References Cited

U.S. PATENT DOCUMENTS 8,977,095 B2 3/2015 Hoover et al.
2003/0086669 A1 5/2003 Shamoto et al.
(Continued)

FOREIGN PATENT DOCUMENTS

JP S61-267707 A 11/1986
JP 2003-029072 A 1/2003
(Continued)

OTHER PUBLICATIONS

Corning, Panda PM Bend Insensitive, 2015 (Year: 2015).*
(Continued)

*Primary Examiner* — Thomas A Hollweg
*Assistant Examiner* — Preet B Patel
(74) *Attorney, Agent, or Firm* — Faegre Drinker Biddle & Reath LLP

(57) ABSTRACT

A polarization-maintaining optical fiber includes at least one polarization maintaining core, a first cladding surrounding the at least one polarization maintaining core, and a second cladding surrounding the first cladding. The at least one polarization maintaining core includes a core and a pair of low-refractive-index portions each having a refractive index lower than a refractive index of the core. In a cross section, at least a portion of an outer periphery of each of the pair of low-refractive-index portions is in contact with the core, and an outer periphery of the core, excluding portions each being in contact with the low-refractive-index portions, has a circular shape. A maximum value of an absolute value of a residual stress in the cross section is 100 MPa or less. A mode-field flattening f is 0.05 to 0.40 at any wavelength within a range of 850 nm to 1625 nm.

21 Claims, 21 Drawing Sheets

(51) Int. Cl.
*C03B 37/027* (2006.01)
*G02B 6/02* (2006.01)
(52) U.S. Cl.
CPC .... *C03B 37/02709* (2013.01); *G02B 6/02042* (2013.01); *C03B 2203/31* (2013.01)

(56) References Cited

U.S. PATENT DOCUMENTS

| | | | |
|---|---|---|---|
| 2005/0031280 | A1 | 2/2005 | Izoe et al. |
| 2009/0060435 | A1 | 3/2009 | Chen et al. |
| 2009/0080843 | A1 | 3/2009 | Bookbinder et al. |
| 2013/0071082 | A1 | 3/2013 | Gagnon et al. |
| 2013/0108206 | A1 | 5/2013 | Sasaoka et al. |
| 2013/0308914 | A1* | 11/2013 | Hayashi ................. G02B 6/024 385/127 |
| 2015/0268413 | A1 | 9/2015 | Hayashi et al. |
| 2016/0126692 | A1* | 5/2016 | DiGiovanni ....... G02B 6/03633 359/341.32 |
| 2016/0274299 | A1* | 9/2016 | Li .......................... G02B 6/024 |
| 2017/0219768 | A1 | 8/2017 | Hayashi et al. |

FOREIGN PATENT DOCUMENTS

| | | | |
|---|---|---|---|
| JP | 2003-337238 | A | 11/2003 |
| JP | 2013-080126 | A | 5/2013 |
| JP | 2015-184371 | A | 10/2015 |
| JP | 2017-016002 | A | 1/2017 |
| JP | 2018-512618 | A | 5/2018 |
| WO | WO-2016/153845 | A1 | 9/2016 |

OTHER PUBLICATIONS

International Standard, ISO 11146: Lasers and laser-related equipment—Test methods for laser beam parameters—Beam widths, divergence angle and beam propagation factor, 1999 (Year: 1999).*

Noda, J. et al., “Polarization-Maintaining Fibers and Their Applications,” Journal of Lightwave Technology, 4(8), pp. 1071-1089 (1986).

* cited by examiner

POLARIZATION MAINTAINING OPTICAL FIBER AND POLARIZATION MAINTAINING OPTICAL FIBER MANUFACTURING METHOD

TECHNICAL FIELD

The present disclosure relates to a polarization-maintaining optical fiber and a method of manufacturing a polarization-maintaining optical fiber. This application claims priority based on Japanese Patent Application No. 2021-020621 filed on Feb. 12, 2021, and the entire contents of the Japanese patent application are incorporated herein by reference.

BACKGROUND ART

There is known a polarization-maintaining optical fiber in which a stress applying part (SAP) made of a material different from a material of a cladding are provided inside the cladding. Due to the SAP, stress-induced birefringence can be induced. A polarization-maintaining optical fiber using a non-circular core is also known. With the non-circular core, an effective refractive index can be changed by a direction of polarization due to the asymmetry of a refractive index profile in a fiber cross-section.

Non Patent Literature 1 discloses various types of polarization-maintaining optical fibers and typical manufacturing methods.

CITATION LIST

Non Patent Literature

[Non-PTL 1] J. Noda, K. Okamoto, and Y. Sasaki, "Polarization-maintaining fibers and their applications," Journal of Lightwave Technology, 4 (8), 1071-1089 (1986).

SUMMARY OF INVENTION

A polarization-maintaining optical fiber according to the present disclosure includes at least one polarization maintaining core, an optical cladding surrounding the at least one polarization maintaining core, and a common physical cladding surrounding the optical cladding. The at least one polarization maintaining core includes a core made of glass and a pair of low-refractive-index portions each having a refractive index lower than a refractive index of the core. A refractive index of the optical cladding is lower than the refractive index of the core. A refractive index of the common physical cladding is lower than the refractive index of the core. In a cross section perpendicular to a longitudinal direction of the polarization-maintaining optical fiber, at least a portion of an outer periphery of each of the pair of low-refractive-index portions is in contact with the core and an outer periphery of the core, excluding portions each being in contact with the low-refractive-index portions, has a circular shape. Any one of conditions below holds: a maximum value of an absolute value of a residual stress in the cross section is 100 MPa or less, a difference in thermal expansion coefficient between glasses contained in components of the polarization-maintaining optical fiber is $5\times10^{-7}$/K or less, and the glasses contained in the components of the polarization-maintaining optical fiber are each silica glass containing $B_2O_3$ whose concentration is 1% or less or 0% in terms of mass fraction. A mode-field flattening f defined by equations below is 0.05 to 0.40 at any wavelength within a range of 850 nm to 1625 nm, $$f = 1 - \frac{\min(D4\sigma_X, D4\sigma_Y)}{\max(D4\sigma_X, D4\sigma_Y)} \quad \text{[Math. 1]}$$

$$D4\sigma_X = 4\sqrt{\frac{\iint I(X,Y)(X-\overline{X})^2 dXdY}{\iint I(X,Y)dXdY}}$$

$$D4\sigma_Y = 4\sqrt{\frac{\iint I(X,Y)(Y-\overline{Y})^2 dXdY}{\iint I(X,Y)dXdY}}$$

$$\overline{X} = \frac{\iint I(X,Y)XdXdY}{\iint I(X,Y)dXdY}$$

$$\overline{Y} = \frac{\iint I(X,Y)YdXdY}{\iint I(X,Y)dXdY}$$

where a near-field intensity distribution described by a local coordinate system of the at least one polarization maintaining core is I (X, Y) in the cross section, an X axis of the local coordinate system being an axis parallel to a straight line that connects centers of the pair of low-refractive-index portions to each other and passing through an origin corresponding to a center of the at least one polarization maintaining core, and a Y axis of the local coordinate system being an axis perpendicular to the X axis and passing through the origin.

A method of manufacturing a polarization-maintaining optical fiber according to the present disclosure is a method of manufacturing a polarization-maintaining optical fiber that includes at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding. The method of manufacturing a polarization-maintaining optical fiber includes preparing an optical preform that is made of glass, has cylindrical symmetry, and includes a core portion and an optical cladding portion; preparing low-refractive-index-portion preforms that are each made of glass, each have cylindrical symmetry, and each have a thermal expansion coefficient that differs by $5\times10^{-7}$/K or less from a thermal expansion coefficient of the core portion; forming a pair of holes that each have a cylindrical shape into the optical preform such that the pair of holes are point-symmetrically arranged with respect to a central axis of the optical preform in a cross section perpendicular to the central axis of the optical preform and have central axes parallel to the central axis of the optical preform; inserting each of the low-refractive-index-portion preforms into a corresponding one of the pair of holes of the optical preform and integrating the low-refractive-index-portion preforms with the optical preform by heating the low-refractive-index-portion preforms and the optical preform in such a manner as to form at least one polarization-maintaining optical preform corresponding to the at least one polarization maintaining core; and spinning the at least one polarization-maintaining optical preform by drawing the at least one polarization-maintaining optical preform after or while providing a common physical cladding portion around the at least one polarization-maintaining optical preform.

A method of manufacturing a polarization-maintaining optical fiber according to the present disclosure is a method of manufacturing a polarization-maintaining optical fiber that includes at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding. The method of manufacturing a polarization-maintaining optical fiber includes preparing a basic-optical-fiber preform including a core portion that is made of glass and has cylindrical symmetry, an optical cladding portion that surrounds the core portion, has cylindrical symmetry, is made of glass, and has a thermal expansion coefficient that differs by $5\times10^{-7}$/K or less from a thermal expansion coefficient of the core portion, and a common physical cladding portion that surrounds the optical cladding portion, is made of glass, has an outer periphery that has translational symmetry along a predetermined axis, and has a thermal expansion coefficient that differs by $5\times10^{-7}$/K or less from the thermal expansion coefficient of the core portion; forming into the basic-optical-fiber preform a pair of holes that each have a cylindrical shape, are arranged point-symmetrically with respect to a central axis of the core portion in a cross section perpendicular to the central axis of the core portion, and have central axes parallel to the central axis of the core portion, such that at least a portion of each of the pair of holes is formed across the core portion and the optical cladding portion; preparing low-refractive-index-portion preforms that are each made of glass, each have cylindrical symmetry, each have a thermal expansion coefficient that differs by $5\times10^{-7}$/K or less from the thermal expansion coefficient of the core portion and from a thermal expansion coefficient of the common physical cladding portion, and have outer diameters adjusted such that each of the low-refractive-index-portion preforms is insertable into a corresponding one of the pair of holes; and inserting each of the low-refractive-index-portion preforms into the corresponding one of the pair of holes of the basic-optical-fiber preform and spinning the low-refractive-index-portion preforms and the basic-optical-fiber preform by drawing the low-refractive-index-portion preforms and the basic-optical-fiber preform after or while integrating the low-refractive-index-portion preforms with the basic-optical-fiber preform.

DESCRIPTION OF EMBODIMENTS

Figure 1:
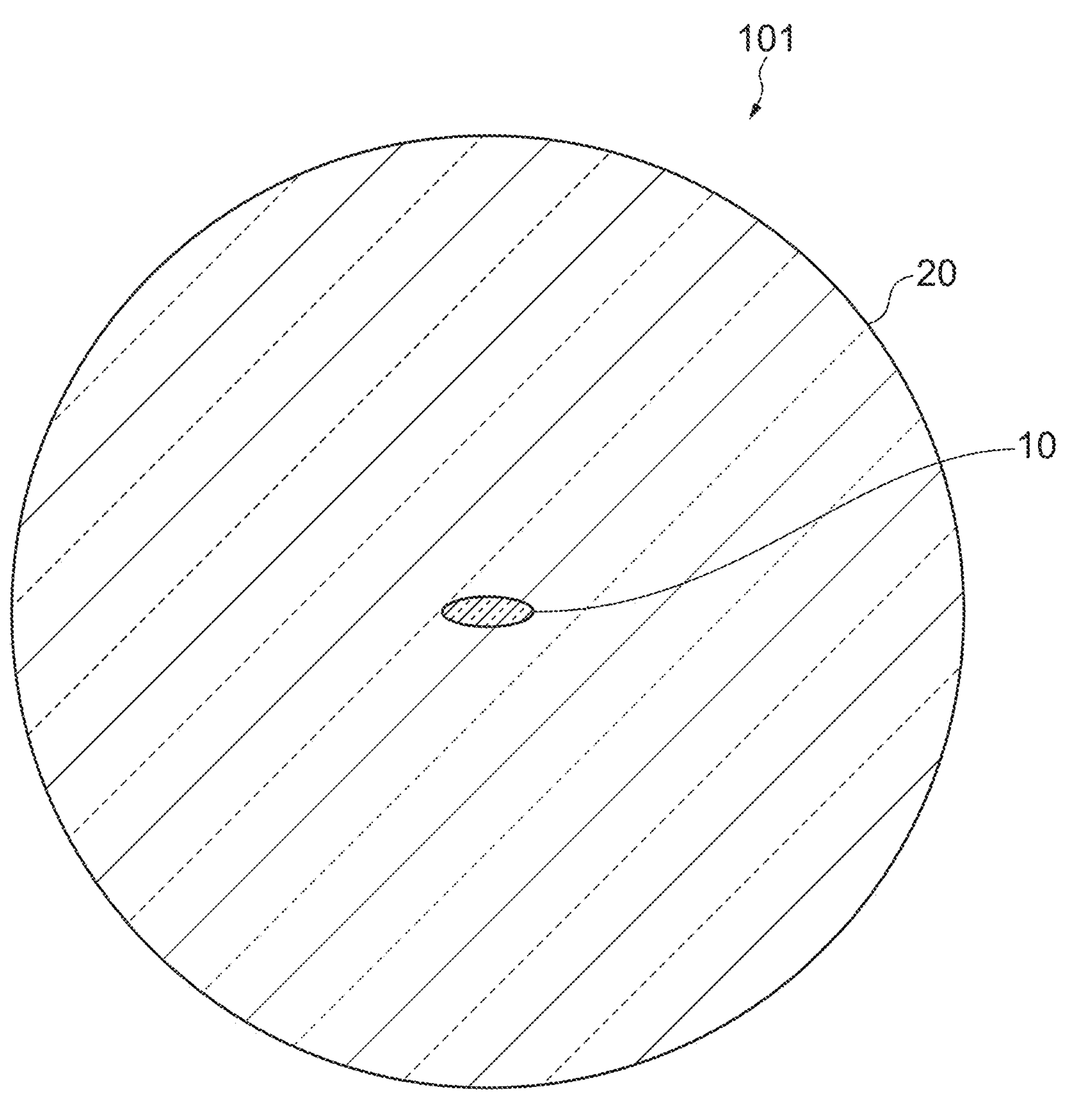
FIG. 1 is a cross-sectional view of a polarization-maintaining optical fiber according to a first comparative example.

Problems to be Solved by Present Disclosure

In a polarization-maintaining optical fiber including a SAP, the thermal expansion coefficient of a material of the SAP needs to be significantly different from the thermal expansion coefficient of a material of the cladding in order to induce a sufficiently strong birefringence to maintain the polarization. This makes an optical fiber preform very fragile and difficult to manufacture. A polarization-maintaining optical fiber having a non-circular core has a high connection loss when connected to a normal standard optical fiber such as a general-purpose single mode fiber.

In recent years, there has been an increasing need in data centers for polarization-maintaining optical fibers that perform connection for a very short distance (e.g., 10 cm to 1 m, 1 m to 5 m, or 5 m to 10 m) between a single-polarization laser light source and a polarization-dependent silicon photonic waveguide while maintaining polarization. In such data center applications, very inexpensive and large quantities of polarization-maintaining optical fibers are required. However, conventional polarization-maintaining optical fibers, which are difficult to mass-produce and expensive, cannot meet the needs.

It is therefore an object to provide a polarization-maintaining optical fiber that is easy to manufacture, allows suppression of a connection loss with an ordinary optical fiber (in other words, a coupling loss (Gaussian beam coupling loss) on input and output of an optical beam that can be approximated as having a circularly symmetric Gaussian intensity distribution in a cross section perpendicular to a traveling direction), and has a polarization maintaining performance sufficient to suppress a polarization mode loss due to polarization crosstalk during short-distance propagation, and a method of manufacturing the polarization-maintaining optical fiber.

Advantageous Effects of Present Disclosure

According to the present disclosure, it is possible to provide a polarization-maintaining optical fiber that is easy to manufacture, allows suppression of a connection loss with an ordinary optical fiber, and has a sufficient polarization maintaining performance for short-distance propagation, and a method of manufacturing the polarization-maintaining optical fiber.

Description of Embodiments of Present Disclosure

First, embodiments according to the present disclosure will be listed and described. A polarization-maintaining optical fiber according to an embodiment of the present disclosure includes at least one polarization maintaining core, an optical cladding surrounding the at least one polarization maintaining core, and a common physical cladding surrounding the optical cladding. The at least one polarization maintaining core includes a core made of glass and a pair of low-refractive-index portions each having a refractive index lower than a refractive index of the core. A refractive index of the optical cladding is lower than the refractive index of the core. A refractive index of the common physical cladding is lower than the refractive index of the core. At least a portion of an outer periphery of each of the pair of low-refractive-index portions is in contact with the core in a cross section perpendicular to a longitudinal direction of the polarization-maintaining optical fiber, and an outer periphery of the core, excluding portions each being in contact with the low-refractive-index portions, has a circular shape. Any one of conditions below holds: a maximum value of an absolute value of a residual stress in the cross section is 100 MPa or less, a difference in thermal expansion coefficient between glasses contained in components of the polarization-maintaining optical fiber is $5\times10^{-7}$/K or less, and the glasses contained in the components of the polarization-maintaining optical fiber are each silica glass containing $B_2O_3$ whose concentration is 1% or less or 0% in terms of mass fraction. A mode-field flattening f defined by equations below is 0.05 to 0.40 at any wavelength within a range of 850 nm to 1625 nm, $$f = 1 - \frac{\min(D4\sigma_X, D4\sigma_Y)}{\max(D4\sigma_X, D4\sigma_Y)} \quad \text{[Math. 2]}$$

$$D4\sigma_X = 4\sqrt{\frac{\iint I(X, Y)(X-\overline{X})^2 dXdY}{\iint I(X, Y)dXdY}}$$

$$D4\sigma_Y = 4\sqrt{\frac{\iint I(X, Y)(Y-\overline{Y})^2 dXdY}{\iint I(X, Y)dXdY}}$$

$$\overline{X} = \frac{\iint I(X, Y)XdXdY}{\iint I(X, Y)dXdY}$$

$$\overline{Y} = \frac{\iint I(X, Y)YdXdY}{\iint I(X, Y)dXdY}$$

where a near-field intensity distribution described by a local coordinate system of the at least one polarization maintaining core is I (X, Y) in the cross section, an X axis of the local coordinate system being an axis parallel to a straight line that connects centers of the pair of low-refractive-index portions to each other and passing through an origin corresponding to a center of the at least one polarization maintaining core, and a Y axis of the local coordinate system being an axis perpendicular to the X axis and passing through the origin. Here, $$(\overline{X}, \overline{Y}) \quad \text{[Math. 3]}$$

the above notation denotes a center of gravity of I (X, Y), $D4\sigma_X$ denotes a D4σ beam width in X axis direction, and $D4\sigma_Y$ denotes a D4σ beam width in the Y axis direction. A magnitude of birefringence can be measured by, for example, a method described in JIS C6872:2008 "Beat length measurement of polarization-maintaining optical fibers". In order to achieve a birefringence of $1\times10^{-5}$ or more, f≥0.05 is necessary. For a Gaussian beam coupling loss to be 0.35 dB or less, f≤0.40 is required, for a Gaussian beam coupling loss to be 0.2 dB or less, f≤0.30 is required, and for a Gaussian beam coupling loss to be 0.1 dB or less, f≤0.25 is required.

The polarization-maintaining optical fiber allows a connection loss to be suppressed when connected to an ordinary optical fiber. Since no SAP is required inside the core and a cladding, an optical fiber preform is prevented from being broken or ruptured due to a difference in thermal expansion coefficient. Therefore, it is easy to manufacture. The polarization-maintaining optical fiber has a sufficient polarization maintaining performance for short-distance propagation.

In the polarization-maintaining optical fiber, in the cross section, any one or more of first to fifth conditions below may be satisfied. The first condition is that the outer periphery of each of the pair of low-refractive-index portions has a circular shape. The second condition is that the pair of low-refractive-index portions are point-symmetrically arranged with respect to a central axis of the at least one polarization maintaining core. The third condition is that a refractive index distribution of the at least one polarization maintaining core, excluding the low-refractive-index portions, is axisymmetric with respect to the central axis of the at least one polarization maintaining core. The fourth condition is that portions of the outer periphery of each of the pair of low-refractive-index portions that is not in contact with the at least one polarization maintaining core are in contact with the optical cladding. The fifth condition is that the pair of low-refractive-index portions are each made of glass, and a difference between a thermal expansion coefficient of the glass contained in the low-refractive-index portions constituting the polarization-maintaining optical fiber, and a thermal expansion coefficient of the glass contained in the other portions constituting the polarization-maintaining optical fiber is $5\times10^{-7}$/K or less, or a concentration of $B_2O_3$ contained in the glass of the low-refractive-index portions is 1% or less or 0% in terms of mass fraction. In this case, by drilling holes parallel to the central axis in the optical fiber preform, inserting low-refractive-index-portion preforms into the holes, and integrating the optical fiber preform and the low-refractive-index-portion preforms by heating, formation of the low-refractive-index portions in the optical fiber preform is facilitated, and an excellent polarization maintaining performance can be achieved when the optical fiber is formed.

The at least one polarization maintaining core may include a plurality of polarization maintaining cores. In this case, a plurality of polarization-maintaining light beams can be propagated.

The plurality of polarization maintaining cores may be arranged in such a manner as to have two or more-fold rotational symmetry with respect to a central axis of the common physical cladding in the cross section. In this case, it is possible to easily perform optical coupling to grating couplers arranged in such a manner as to have two or more-fold rotational symmetry.

In the cross section, the plurality of polarization maintaining cores may have polarization maintaining directions perpendicular to a straight line that connects central axes of the pair of low-refractive-index portions to each other and passing through central axes of the plurality of polarization maintaining cores and may be arranged in such a manner that positions and the polarization maintaining directions have two or more-fold rotational symmetry with respect to a central axis of the common physical cladding. In this case, wiring directions of waveguides on a silicon photonics substrate through which light is input and output by the grating couplers can also be made to have rotational symmetry, so that the wiring of the waveguides to the grating couplers is facilitated.

In the cross section, the plurality of polarization maintaining cores may have polarization maintaining directions perpendicular to a straight line that connects central axes of the pair of low-refractive-index portions to each other and passing through central axes of the plurality of polarization maintaining cores and may be arranged such that all the polarization maintaining directions are parallel to each other. In this case, it is possible to easily perform optical coupling to grating couplers arranged such that polarization directions (polarization axes) that can be input and output are parallel to each other.

In the cross section, the plurality of polarization maintaining cores may have polarization maintaining directions perpendicular to a straight line that connects central axes of the pair of low-refractive-index portions to each other and passing through central axes of the plurality of polarization maintaining cores and may be arranged in such a manner that positions and the polarization maintaining directions of the plurality of polarization maintaining cores have line symmetry with respect to a straight line passing through a central axis of the common physical cladding. In this case, it is possible to easily couple to grating couplers arranged in such a manner that positions and polarization axes of the grating couplers have line symmetry with respect to the straight line passing through the central axis of the cladding.

Inequalities below may be satisfied.

$0.8 \leq r40/r10 \leq 2.0$, $0.2 \leq (d-r21)/r10 \leq 0.6$, $0.5\% \leq \Delta 10-\Delta 40 \leq 2.0\%$, and $0.5\% \leq \Delta 10-\Delta 21 \leq 2.0\%$, where r10 is a radius of the core, r40 is a radius of each of the low-refractive-index portions, and r21 is a radius of the optical cladding; where Δ10 is a relative refractive index difference of the core, Δ40 is a relative refractive index difference of each of the low-refractive-index portions, and Δ21 is a relative refractive index difference of the optical cladding, with the refractive index of the common physical cladding used as a reference; and where d is a distance between a central axis of the at least one polarization maintaining core and a central axis of each of the low-refractive-index portions. In this case, both an increase in birefringence and a reduction in Gaussian beam connection loss can be achieved at the same time.

A first condition or a second condition expressed by inequalities below may be satisfied.

First condition:

$3\ \mu m \leq r10 \leq 6\ \mu m$ $2.5 \leq r21/r10 \leq 3.6$ $0.70\% \leq \Delta 10-\Delta 40 \leq 0.85\%$ $0.70\% \leq \Delta 10-\Delta 21 \leq 0.85\%$ $0.40\% \leq \Delta 10 \leq 0.63\%$ $\Delta 21 \leq 0\%$ $\Delta 40 \leq 0\%$ Second condition:

$3\ \mu m \leq r10 \leq 6\ \mu m$ $2.5 \leq r21/r10 \leq 3.7$ $0.50\% \leq \Delta 10-\Delta 40 \leq 0.65\%$ $0.50\% \leq \Delta 10-\Delta 21 \leq 0.85\%$ $0.40\% \leq \Delta 10 \leq 0.53\%$ $\Delta 21 \leq 0\%$ $\Delta 40 \leq 0\%$ In this case, in addition to an increase in birefringence and a reduction in Gaussian beam connection loss, a reduction in bending loss and effective single-mode operation at 1310 nm wavelengths can be achieved.

A mode-field average diameter defined by an equation below may be 3 μm to 12 μm or 8.2 μm to 9.6 μm at a wavelength of 1310 nm.

[Math. 4]

$$MFD_{avg} = \sqrt{\frac{D4\sigma_X^2 + D4\sigma_Y^2}{2}} = 2\sqrt{2}\sqrt{\frac{\int\int I(X, Y)\left[(X-\overline{X})^2 + (Y-\overline{Y})^2\right]dXdY}{\int\int I(X, Y)dXdY}}$$

When mode-field flattening f is zero, an $MFD_{avg}$ is equal to an MFD defined by a second moment width of a near-field pattern, which is called the MFD of Petermann I. When $MFD_{avg}$ is in the above range, it is possible to suppress a connection loss due to MFD mismatch with a general single-mode optical fiber.

A birefringence may be $5\times10^{-6}$ to $5\times10^{-5}$ at any wavelength within the range of 850 nm to 1625 nm. In this case, polarization can be sufficiently maintained for short-distance applications in data centers.

When a length of the polarization-maintaining optical fiber in the longitudinal direction is 10 cm to 1 m, 1 m to 5 m, or 5 m to 10 m, a polarization crosstalk may be −26.4 dB or more at any wavelength within the range of 850 nm to 1625 nm. In this case, excessive suppression of the polarization crosstalk can be avoided, and a polarization-maintaining optical fiber that is easy to manufacture can be provided.

When the length of the polarization-maintaining optical fiber in the longitudinal direction is 10 cm to 1 m, 1 m to 5 m, or 5 m to 10 m, a polarization crosstalk may be −7.2 dB or less, −9.1 dB or less, −10.8 dB or less, −12.3 dB or less, −15.5 dB or less, −16.3 dB or less, or −19.4 dB or less at any wavelength within the range of 850 nm to 1625 nm. In this case, a polarization mode loss can be suppressed.

A birefringence may be less than $1\times10^{-4}$ at any wavelength within the range of 850 nm to 1625 nm. This eliminates a need to induce a strong birefringence, and the SAP becomes unnecessary. Thus, the optical fiber is less likely to rupture during manufacture.

A birefringence is $5\times10^{-6}$ to $5\times10^{-5}$ or $1\times10^{-5}$ to $3\times10^{-5}$ at any wavelength within the range of 850 nm to 1625 nm. In this case, when the length in the longitudinal direction of the fiber is 10 cm to 1 m, 1 m to 5 m, or 5 m to 10 m, a polarization mode loss can be suppressed.

In the cross section, the at least one polarization maintaining core may have a polarization maintaining direction perpendicular to a straight line that connects central axes of the pair of low-refractive-index portions to each other and passing through a central axis of the at least one polarization maintaining core. The polarization-maintaining optical fiber may be bent at a radius of 10 mm or less and is fixed to a holding member such that a bending radius direction and the polarization maintaining direction are perpendicular to each other or parallel to each other in the cross section. In this case, a polarization mode loss can be suppressed.

A method of manufacturing a polarization-maintaining optical fiber according to an embodiment of the present disclosure is a method of manufacturing a polarization-maintaining optical fiber that includes at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding. The method of manufacturing a polarization-maintaining optical fiber includes preparing an optical preform that is made of glass, has cylindrical symmetry, and includes a core portion and an optical cladding portion; preparing low-refractive-index-portion preforms that are each made of glass, each have cylindrical symmetry, and each have a thermal expansion coefficient that differs by $5\times10^{-7}$/K or less from a thermal expansion coefficient of the core portion; forming a pair of holes that each have a cylindrical shape into the optical preform such that the pair of holes are point-symmetrically arranged with respect to a central axis of the optical preform in a cross section perpendicular to the central axis of the optical preform and have central axes parallel to the central axis of the optical preform; inserting each of the low-refractive-index-portion preforms into a corresponding one of the pair of holes of the optical preform and integrating the low-refractive-index-portion preforms with the optical preform by heating the low-refractive-index-portion preforms and the optical preform in such a manner as to form at least one polarization-maintaining optical preform corresponding to the at least one polarization maintaining core; and spinning the at least one polarization-maintaining optical preform by drawing the at least one polarization-maintaining optical preform after or while providing a common physical cladding portion around the at least one polarization-maintaining optical preform.

In the method of manufacturing a polarization-maintaining optical fiber, it is possible to suppress a connection loss with an ordinary optical fiber. A polarization maintaining core having a non-axisymmetric refractive index distribution and exhibiting a polarization maintaining performance is formed. The optical fiber preform is prevented from being broken or ruptured due to the difference in thermal expansion coefficient. Therefore, it is easy to manufacture.

A polarization-maintaining-optical-fiber preform may be formed by providing around the at least one polarization-maintaining optical preform a common physical cladding portion made of glass and having a thermal expansion coefficient that differs by $5\times10^{-7}$/K or less from the thermal expansion coefficient of the core portion. The polarization-maintaining-optical-fiber preform may be heated to melt and drawn in such a manner as to be spun as a polarization-maintaining optical fiber. In this case, the optical fiber preform is further prevented from being broken or ruptured due to the difference between the thermal expansion coefficient of the optical preform and the thermal expansion coefficient of the common physical cladding portion. Therefore, it is easier to manufacture.

The forming the polarization-maintaining-optical-fiber preform may include preparing a physical-cladding preform made of glass, having a thermal expansion coefficient that differs by $5\times10^{-7}$/K or less from the thermal expansion coefficient of the core portion, and having an outer periphery that has translational symmetry along a predetermined axis; forming at least one hole into the physical-cladding preform, the at least one hole having a cylindrical shape and having a central axis parallel to the predetermined axis of the physical-cladding preform in a cross section of the physical-cladding preform perpendicular to the predetermined axis; inserting each of the at least one polarization-maintaining optical preform into a corresponding one of the at least one hole of the physical-cladding preform; and integrating the physical-cladding preform and the at least one polarization-maintaining optical preform, which is inserted in the physical-cladding preform, with each other by heating the physical-cladding preform and the at least one polarization-maintaining optical preform. In this case, a cladding portion can be easily provided.

The spinning the at least one polarization-maintaining optical preform by drawing the at least one polarization-maintaining optical preform after or while providing a common physical cladding portion around the at least one polarization-maintaining optical preform may include preparing a physical-cladding preform made of glass, having a thermal expansion coefficient that differs by $5\times10^{-7}$/K or less from the thermal expansion coefficient of the core portion, and having an outer periphery that has translational symmetry along a predetermined axis; forming at least one hole having a cylindrical shape and having a central axis parallel to the predetermined axis of the physical-cladding preform in a cross section of the physical-cladding preform perpendicular to the predetermined axis into the physical-cladding preform; inserting each of the at least one polarization-maintaining optical preform into a corresponding one of the at least one hole of the physical-cladding preform; and integrating the physical-cladding preform and the at least one polarization-maintaining optical preform, which is inserted in the physical-cladding preform, with each other by heating the physical-cladding preform and the at least one polarization-maintaining optical preform and melting and drawing the physical-cladding preform and the at least one polarization-maintaining optical preform in such a manner as to spin the physical-cladding preform and the at least one polarization-maintaining optical preform as a polarization-maintaining optical fiber. In this case, the optical fiber preform is further prevented from being broken or ruptured due to the difference between the thermal expansion coefficient of the core portion and the thermal expansion coefficient of the physical-cladding preform. Therefore, it is easier to manufacture.

A method of manufacturing a polarization-maintaining optical fiber according to an embodiment of the present disclosure is a method of manufacturing a polarization-maintaining optical fiber that includes at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding. The method of manufacturing a polarization-maintaining optical fiber includes preparing a basic-optical-fiber preform including a core portion that is made of glass and has cylindrical symmetry, an optical cladding portion that surrounds the core portion, has cylindrical symmetry, is made of glass, and has a thermal expansion coefficient that differs by $5\times10^{-7}$/K or less from a thermal expansion coefficient of the core portion, and a common physical cladding portion that surrounds the optical cladding portion, is made of glass, has an outer periphery that has translational symmetry along a predetermined axis, and has a thermal expansion coefficient that differs by $5\times10^{-7}$/K or less from the thermal expansion coefficient of the core portion; forming into the basic-optical-fiber preform a pair of holes that each have a cylindrical shape, are arranged point-symmetrically with respect to a central axis of the core portion in a cross section perpendicular to the central axis of the core portion, and have central axes parallel to the central axis of the core portion, such that at least a portion of each of the pair of holes is formed across the core portion and the optical cladding portion; preparing low-refractive-index-portion preforms that are each made of glass, each have cylindrical symmetry, each have a thermal expansion coefficient that differs by $5\times10^{-7}$/K or less from the thermal expansion coefficient of the core portion and from a thermal expansion coefficient of the common physical cladding portion, and have outer diameters adjusted such that each of the low-refractive-index-portion preforms is insertable into a corresponding one of the pair of holes; and inserting each of the low-refractive-index-portion preforms into the corresponding one of the pair of holes of the basic-optical-fiber preform and spinning the low-refractive-index-portion preforms and the basic-optical-fiber preform by drawing the low-refractive-index-portion preforms and the basic-optical-fiber preform after or while integrating the low-refractive-index-portion preforms with the basic-optical-fiber preform.

In the method of manufacturing the polarization-maintaining optical fiber, it is possible to suppress a connection loss with an ordinary optical fiber. A polarization maintaining core having a non-axisymmetric refractive index distribution and exhibiting a polarization maintaining performance is formed. The optical fiber preform is prevented from being broken or ruptured due to the difference in thermal expansion coefficient. Therefore, it is easy to manufacture.

A polarization-maintaining-optical-fiber preform may be formed by heating the basic-optical-fiber preform and the low-refractive-index-portion preforms, which are inserted in the pair of holes of the basic-optical-fiber preform, such that the basic-optical-fiber preform and the low-refractive-index-portion preforms are integrated with one another, and then, the polarization-maintaining-optical-fiber preform is heated to melt and drawn in such a manner as to be spun as the polarization-maintaining optical fiber. In this case, since an integrated polarization-maintaining optical fiber preform can be formed before spinning, it is easy to manufacture a polarization-maintaining optical fiber having more stable quality.

The basic-optical-fiber preform and the low-refractive-index-portion preforms, which are inserted in the pair of holes of the basic-optical-fiber preform, may be heated to be integrated with one another and melted and drawn in such a manner as to be spun as a polarization-maintaining optical fiber. In this case, since the integrating step before the spinning can be omitted, the manufacturing cost of the polarization-maintaining optical fiber can be further reduced.

The preparing a basic-optical-fiber preform may include preparing at least one optical preform corresponding to the at least one polarization maintaining core that includes the core portion and the optical cladding portion; preparing a physical-cladding preform that is made of glass, has a thermal expansion coefficient that differs by $5\times10^{-7}$/K or less from a thermal expansion coefficient of the at least one optical preform, and has an outer periphery that has translational symmetry along a predetermined axis; forming into the physical-cladding preform at least one hole that has a cylindrical shape, has a central axis parallel to the predetermined axis of the physical-cladding preform in a cross section of the physical-cladding preform perpendicular to the predetermined axis of the physical-cladding preform, and corresponds to the at least one polarization maintaining core; inserting each of the at least one optical preform into a corresponding one of the at least one hole of the physical-cladding preform; and forming the basic-optical-fiber preform by heating the physical-cladding preform and the at least one optical preform, which is inserted in the physical-cladding preform, such that the physical-cladding preform and the at least one optical preform are integrated with each other. In this case, it is possible to easily form a basic-optical-fiber preform having a core portion that has cylindrical symmetry. [Details of Embodiments of Present Disclosure]

Specific examples of the polarization-maintaining optical fiber according to the present disclosure will be described below with reference to the drawings. It should be noted that the present invention is not limited to these examples, but is defined by the scope of claims, and is intended to include all modifications within the meaning and scope equivalent to the scope of claims. In the description of the drawings, the same elements are denoted by the same reference numerals, and redundant description is omitted.

FIG. 1 is a cross-sectional view of a polarization-maintaining optical fiber according to a first comparative example. As illustrated in FIG. 1, a polarization-maintaining optical fiber 101 according to the first comparative example includes a non-circular core 10 and a circular cladding 20 surrounding core 10 in a cross section perpendicular to a longitudinal direction of polarization-maintaining optical fiber 101.

Figure 2:
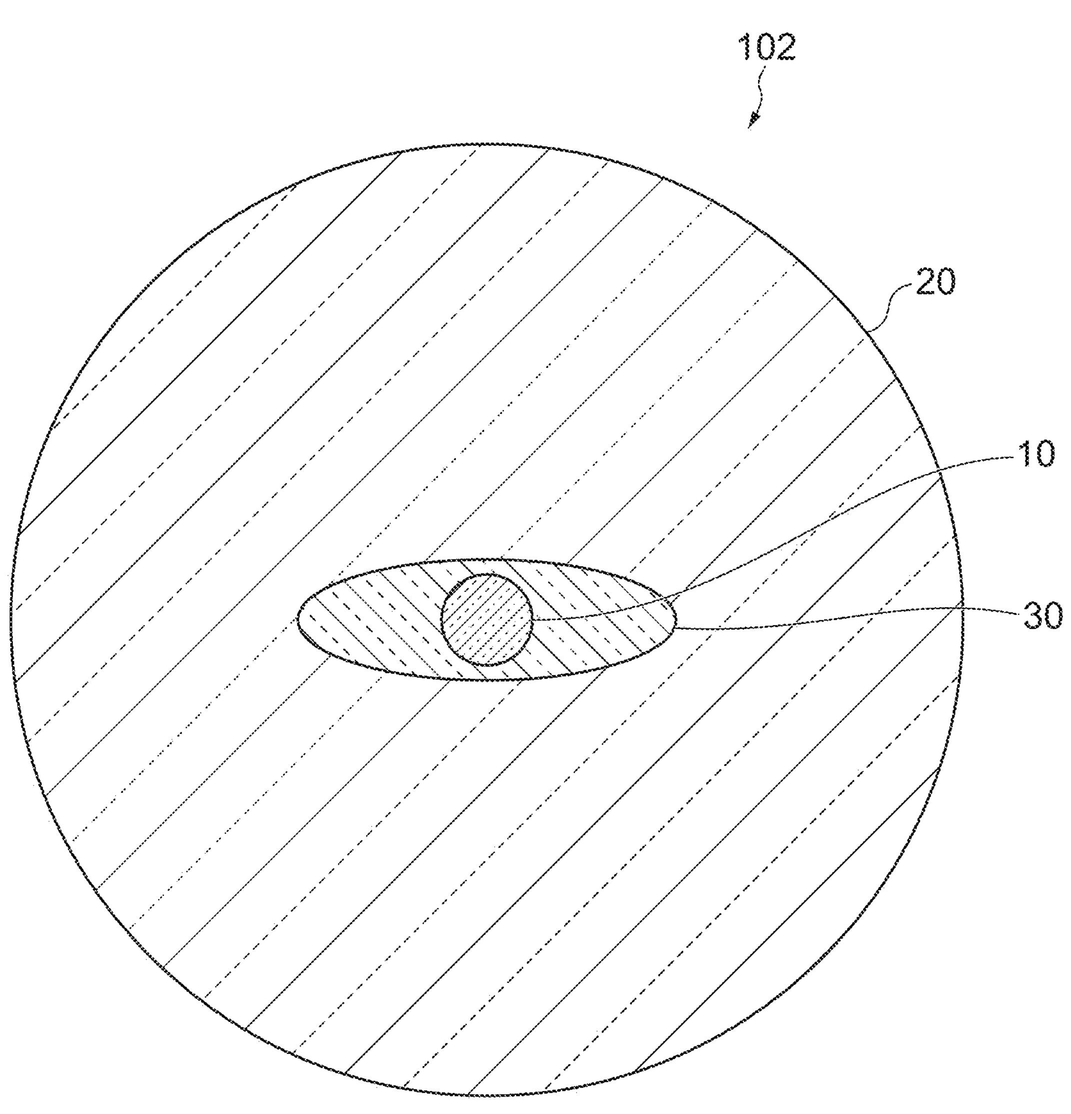
FIG. 2 is a cross-sectional view of a polarization-maintaining optical fiber according to a second comparative example.

FIG. 2 is a cross-sectional view of a polarization-maintaining optical fiber according to a second comparative example. As illustrated in FIG. 2, a polarization-maintaining optical fiber 102 according to the second comparative example includes circular core 10, a non-circular SAP 30 surrounding core 10, and circular cladding 20 surrounding core 10 with SAP 30 interposed therebetween in a cross section perpendicular to a longitudinal direction of polarization-maintaining optical fiber 102. Typically, cladding 20 is made of silica glass and SAP 30 is made of silica glass containing boron (B). Silica glass may contain a trace amount of germanium (Ge), phosphorus (P), chlorine (Cl), or other element.

Figure 3:
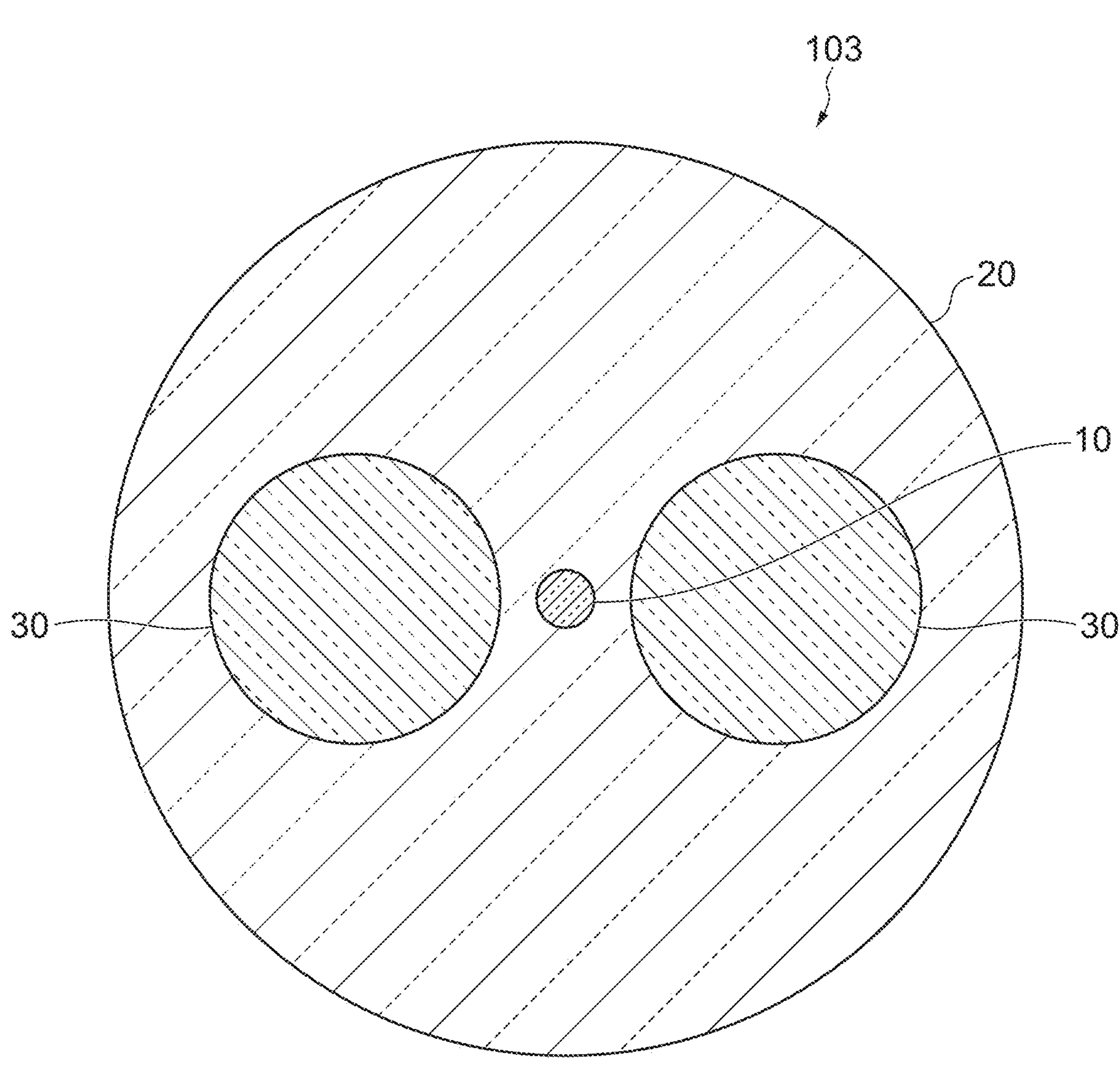
FIG. 3 is a cross-sectional view of a polarization-maintaining optical fiber according to a third comparative example.

FIG. 3 is a cross-sectional view of a polarization-maintaining optical fiber according to a third comparative example. As illustrated in FIG. 3, a polarization-maintaining optical fiber 103 according to the third comparative example includes circular core 10, circular cladding 20 surrounding core 10, and a pair of SAPs 30 arranged inside cladding 20 in a cross section perpendicular to a longitudinal direction of polarization-maintaining optical fiber 103. The pair of SAPs 30 are each circular and arranged point-symmetrically with respect to the central axis of core 10. Polarization-maintaining optical fiber 103 is of a so-called PANDA (Polarization-maintaining AND Absorption-reducing) type.

Figure 4:
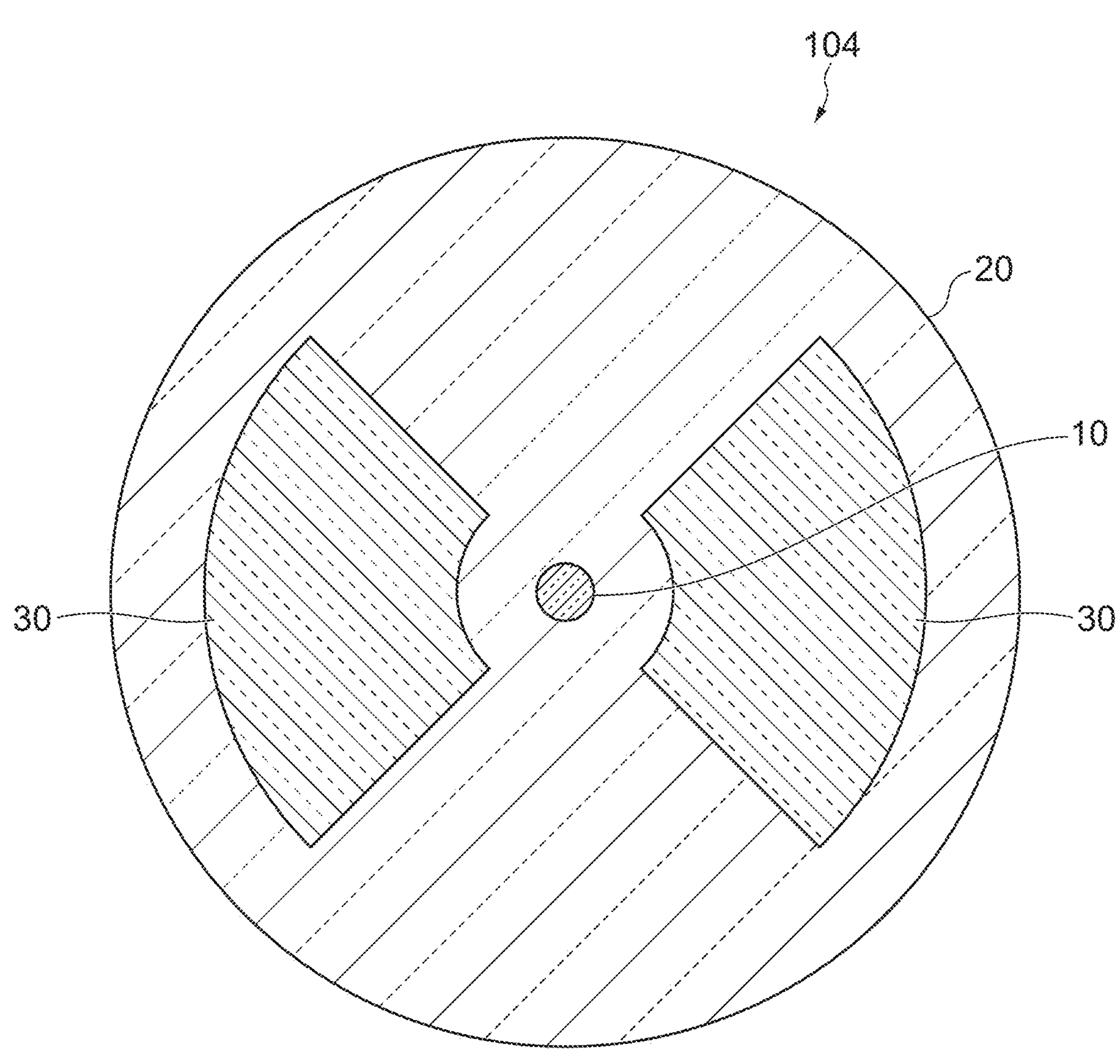
FIG. 4 is a cross-sectional view of a polarization-maintaining optical fiber according to a fourth comparative example.

FIG. 4 is a cross-sectional view of a polarization-maintaining optical fiber according to a fourth comparative example. As illustrated in FIG. 4, a polarization-maintaining optical fiber 104 according to the fourth comparative example includes circular core 10, circular cladding 20 surrounding core 10, and a pair of SAPs 30 arranged inside cladding 20 in a cross section perpendicular to a longitudinal direction of polarization-maintaining optical fiber 104. The pair of SAPs 30 are arranged point-symmetrically with respect to the central axis of core 10. The pair of SAPs 30 are arranged away from core 10. The pair of SAPs 30 are each substantially trapezoidal and arranged such that a short side of each of SAPs 30 faces each other. In other words, each of SAPs 30 is arranged such that the short side of each of SAPs 30 faces the central axis of core 10. The short side and the long side of each of SAPs 30 are curved along an outer periphery of core 10. Polarization-maintaining optical fiber 104 is of a so-called bow-tie type.

In the polarization-maintaining optical fiber described in the Non-PTL 1 and the polarization-maintaining optical fibers having cross-sectional structures such as polarization-maintaining optical fibers 101 and 102, a non-circular core or SAP is formed by deforming the cross-sectional structure when the optical fiber preform is melted. When such a manufacturing step is required, it is difficult to control a roundness of outer periphery of a cladding in a finished optical fiber. It is also difficult to control the shape and size of the core. Furthermore, in polarization-maintaining optical fiber 101, since core 10 is non-circular, the shape of an electric field distribution of a propagation mode guided through core 10 is not circularly symmetric. Therefore, the matching with a circularly symmetric propagation mode deteriorates. As a result, the connection loss between polarization-maintaining optical fiber 101 and an ordinary optical fiber increases.

Each of polarization-maintaining optical fibers 102, 103, and 104 includes SAP 30. As described above, a thermal expansion coefficient of SAP 30 needs to be significantly different from a thermal expansion coefficient of core 10 and a thermal expansion coefficient of cladding 20. For this reason, a very large residual stress (internal stress) is applied to an optical fiber preform during the manufacturing process, so that the optical fiber preform is easily broken or ruptured, making the manufacturing process very difficult. Therefore, it is difficult to mass-produce polarization-maintaining optical fibers that are currently widely used, and the polarization-maintaining optical fibers are expensive.

The present inventors have investigated a polarization-maintaining optical fiber for use in data centers that performs connection for a very short distance (for example, 10 cm to 1 m, 1 m to 5 m, or 5 m to 10 m) between a single-polarization laser light source and a polarization-dependent silicon-photonic waveguide while maintaining polarization. As a result, the present inventors have found that the performance required for a polarization-maintaining optical fiber for use in data centers is not to suppress crosstalk between two polarization light waves perpendicular to each other, but to input single-polarization light output from a laser light source to an optical input portion (a grating coupler, an edge coupler, or the like) of a silicon photonics waveguide with a polarization in a predetermined direction and with as little loss as possible.

When a polarization-maintaining optical fiber is bent or twisted, coupling between polarization modes occurs. The coupling between polarization modes is also caused by micro bends that are small random bends having a radius smaller than the order of millimeters. In a polarization-maintaining optical fiber, it is necessary to suppress polarization crosstalk (crosstalk or interference from a predetermined polarization mode to another polarization mode) to an extremely low level (to −30 dB or less even after 100 m propagation) by suppressing coupling between polarization modes. For this purpose, in the polarization-maintaining optical fiber, it is necessary to induce a strong birefringence ($10^{-4}$ or more) between the polarized waves. Therefore, it is necessary to manufacture a polarization-maintaining optical fiber by using a glass material having a shape or combination that is difficult to manufacture.

The present inventors have found that polarization mode loss is a problem in polarization-maintaining optical fibers for use in data centers and that polarization crosstalk does not need to be suppressed as much as in conventional polarization-maintaining optical fibers with a level of −30 dB or less. The polarization mode loss is a transmission loss of a predetermined polarization mode caused by light leaking from the predetermined polarization mode propagating laser light with a single polarization and coupling to the other polarization mode due to polarization mode coupling. Therefore, the polarization mode loss results in decreasing a light intensity of the predetermined polarization mode.

Two perpendicular polarization maintaining axes of a polarization-maintaining optical fiber are an x-axis and a y-axis. An x-axis polarized-light component and a y-axis polarized-light component of an intensity of light output from the other end face of the polarization-maintaining optical fiber when linearly polarized light is input from one end face of the polarization-maintaining optical fiber are represented by Px and Py, respectively. When light polarized in the x-axis direction is input on the one end face, a polarization crosstalk [dB] is defined by $10 \log_{10} (Py/Px)$, and a polarization mode loss [dB] is defined by $-10 \log_{10} [Px/(Px+Py)]$. When light polarized in the y-axis direction is input on the one end face, a polarization crosstalk [dB] is defined by $10 \log_{10} (Px/Py)$, and a polarization mode loss [dB] is defined by $-10 \log_{10} [Py/(Px+Py)]$.

It is known that the polarization crosstalk increases by dB when a fiber length is increased by a factor of 10. For example, the fact that a polarization crosstalk is −30 dB or less after 100 m propagation is synonymous with the fact that it is −40 dB or less after 10 m propagation, −50 dB or less after 1 m propagation, and −60 dB or less after 10 cm propagation. An actually measured polarization crosstalk has a lower limit value of measurement. Therefore, in a short polarization-maintaining optical fiber, the polarization crosstalk may appear to be larger than a true value of the polarization-maintaining optical fiber itself. The reason for the lower limit value of measurement is that a polarization extinction ratio of light itself input to a polarization-maintaining optical fiber during polarization crosstalk measurement is not sufficiently high. In addition, it can be due to a mismatch of fast and slow axes (that is, a polarization direction in which polarization can be maintained) of a polarization-maintaining optical fiber with an angle of incident polarized light, and also an imperfect condition of an angle and a polarization extinction ratio of a polarizer on an output side.

Figure 5:
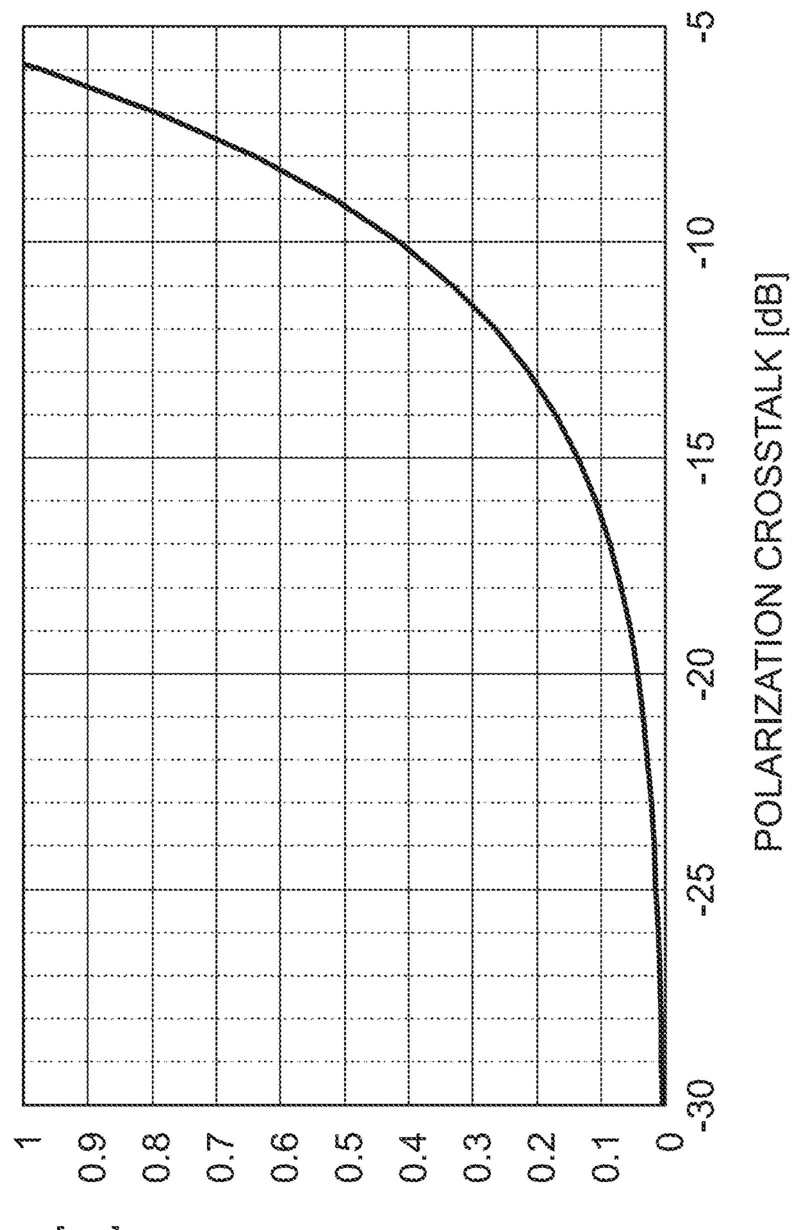
FIG. 5 is a graph illustrating a relationship between a polarization crosstalk and a polarization mode loss.

FIG. 5 is a graph illustrating a relationship between a polarization crosstalk and a polarization mode loss. A horizontal axis represents a polarization crosstalk [dB], and a vertical axis represents a polarization mode loss [dB].

In order to suppress a polarization mode loss to 1.0 dB or less, it is sufficient that a polarization crosstalk is −5.9 dB or less. In order to suppress a polarization mode loss to 0.75 dB or less, it is sufficient that a polarization crosstalk is −7.2 dB or less. In order to suppress a polarization mode loss to 0.50 d or less, it is sufficient that a polarization crosstalk is −9.1 dB or less. In order to suppress a polarization mode loss to 0.35 dB or less, it is sufficient that a polarization crosstalk is −10.8 dB or less. In order to suppress a polarization mode loss to 0.25 dB or less, it is sufficient that a polarization crosstalk is −12.3 dB or less. In order to suppress a polarization mode loss to 0.12 dB or less, it is sufficient that a polarization crosstalk is −15.5 dB or less. In order to suppress a polarization mode loss to 0.1 dB or less, it is sufficient that a polarization crosstalk is −16.3 dB or less. In order to suppress a polarization mode loss to 0.05 dB or less, it is sufficient that a polarization crosstalk is −19.4 dB or less. In order to suppress a polarization mode loss to 0.01 dB or less, it is sufficient that a polarization crosstalk is −26.4 dB or less. In order to suppress a polarization mode loss to 0.005 dB or less, it is sufficient that a polarization crosstalk is −29.4 dB or less.

Therefore, a polarization crosstalk of −30 dB or less after 100 m propagation (i.e., −40 dB or less after 10 m propagation, −50 dB or less after 1 m propagation, and −60 dB or less after 10 cm propagation) required for a conventional polarization-maintaining optical fiber is an excessive polarization maintaining performance for data center applications. By lowering the polarization-maintaining performance, it is possible to provide a polarization-maintaining optical fiber having a sufficient polarization-maintaining performance for short-distance propagation, while being easy to manufacture and suppressing a connection loss with an ordinary optical fiber, and to provide a method of manufacturing the polarization-maintaining optical fiber.

When a length is 10 cm to 1 m, 1 m to 5 m, or 5 m to 10 m, a polarization crosstalk is more preferably −26.4 dB or more at any wavelength within the range of 850 nm to 1625 nm. As a result, it is possible to manufacture a polarization-maintaining optical fiber having a structure that is easy to manufacture by further lowering the polarization maintaining performance. In order to further reduce a polarization mode loss, when a length is 10 cm to 1 m, 1 m to 5 m, or 5 m to 10 m, a polarization crosstalk is more preferably −7.2 dB or less, −9.1 dB or less, −10.8 dB or less, −12.3 dB or less, −15.5 dB or less, −16.3 dB or less, or −19.4 dB or less at any wavelength within the range of 850 nm to 1625 nm. Such a polarization crosstalk is preferably achieved in a state in which the polarization-maintaining optical fiber is bent at a radius 5 cm to 20 cm.

Figure 6:
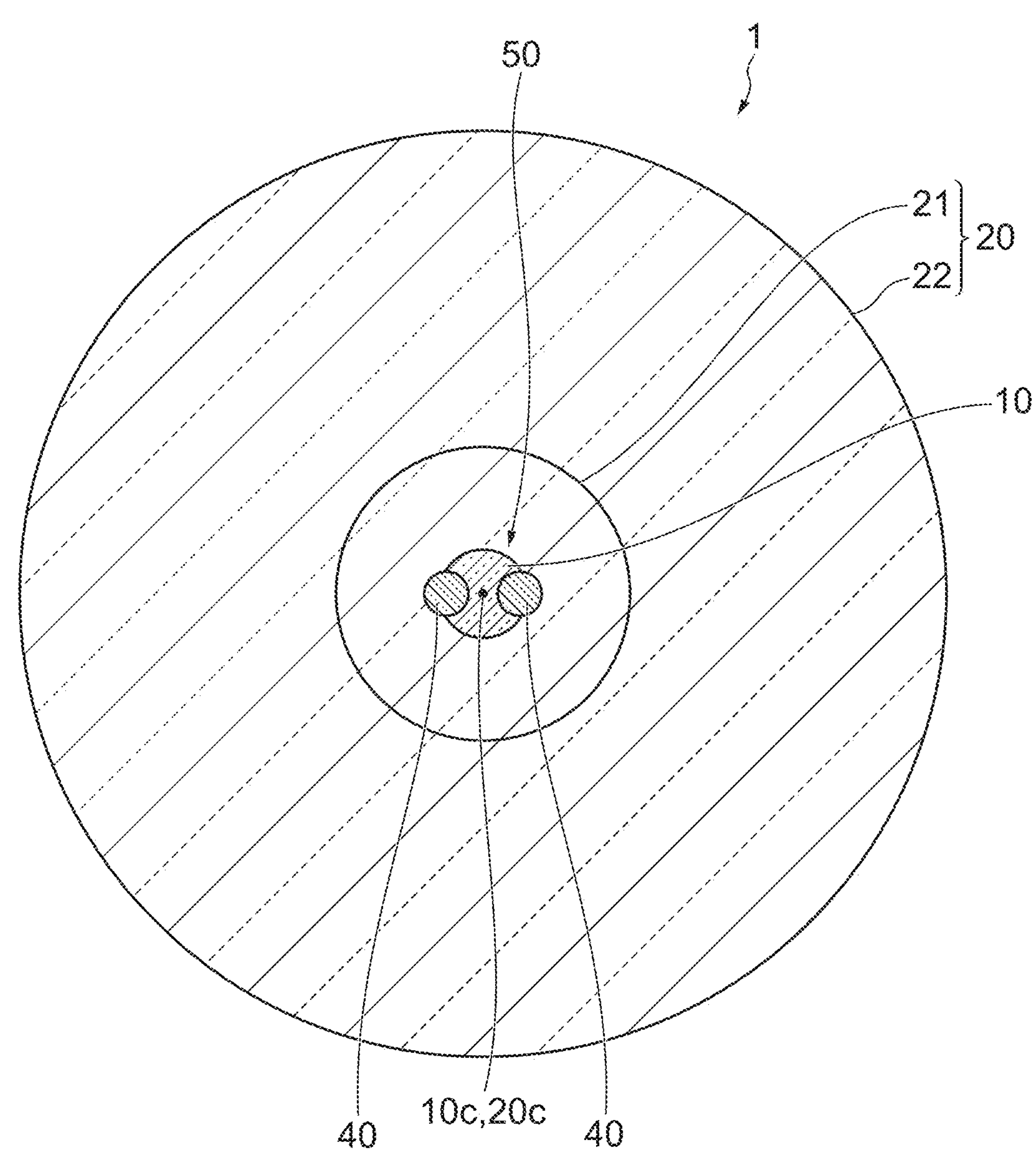
FIG. 6 is a cross-sectional view of a polarization-maintaining optical fiber according to an embodiment.
Figure 7:
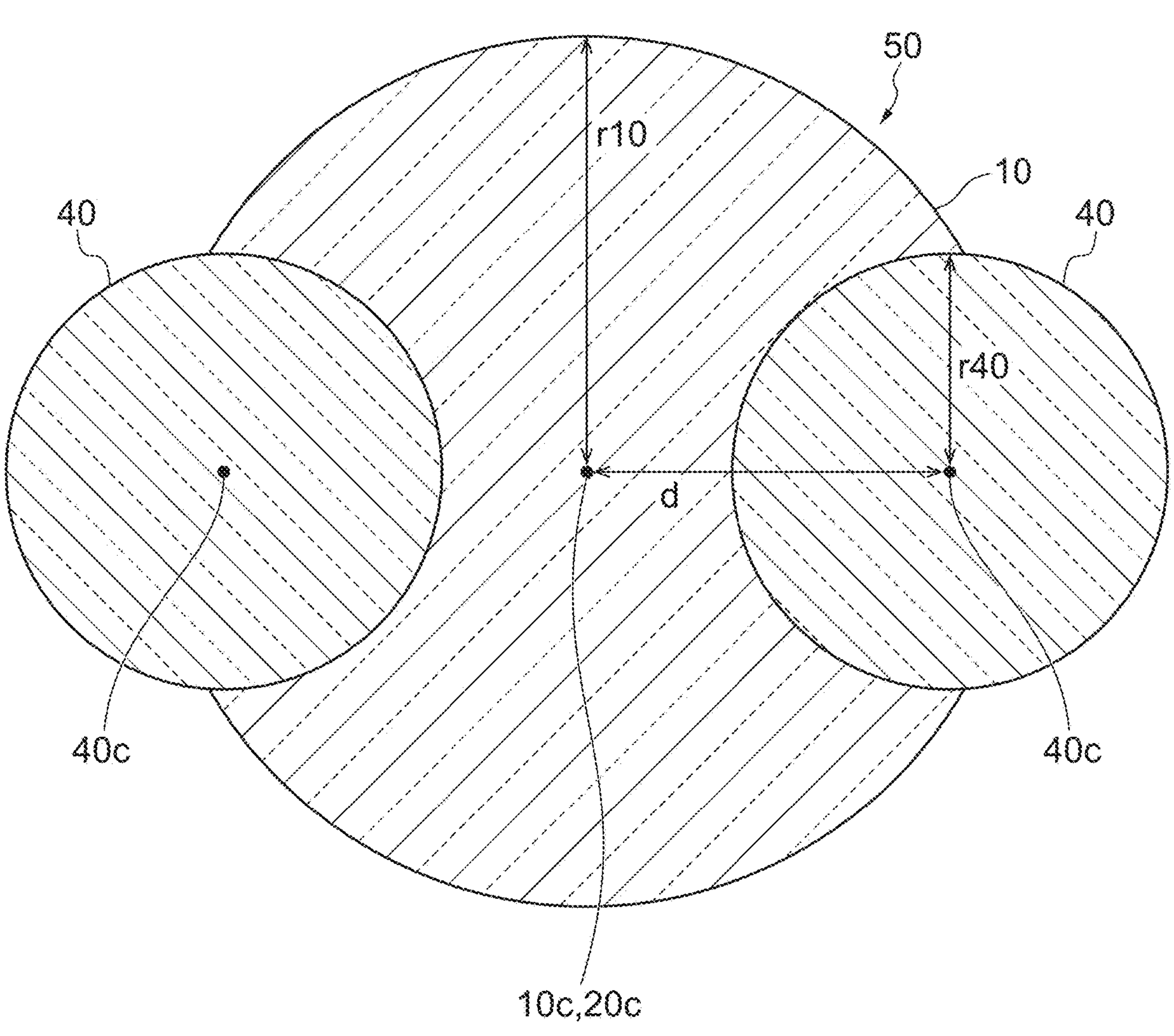
FIG. 7 is a partially enlarged cross-sectional view of the polarization-maintaining optical fiber illustrated in FIG. 6.

FIG. 6 is a cross-sectional view of a polarization-maintaining optical fiber according to an embodiment. FIG. 7 is a partially enlarged cross-sectional view of the polarization-maintaining optical fiber illustrated in FIG. 6. As illustrated in FIGS. 6 and 7, a polarization-maintaining optical fiber 1 according to the embodiment includes core 10, cladding 20 surrounding core 10, and a pair of low-refractive-index portions 40 in which at least a portion of each of low-refractive-index portions 40 is arranged inside core 10, in a cross section perpendicular to a longitudinal direction of polarization-maintaining optical fiber 1 (hereinafter, simply referred to as a "cross section"). No SAP is provided inside core 10 and cladding 20. In the cross section, an outer peripheral surface of core 10 has a circular shape except for low-refractive-index portions 40, and an ellipticity (=1−short axis/long axis) is 5% or less, 3% or less, 2% or less, 1% or less, or 0%. In the present embodiment, the outer peripheral surface of core 10 has a circular shape except for low-refractive-index portions 40 regardless of low-refractive-index portions 40. An outer peripheral surface of cladding 20 also has a circular shape.

In an embodiment of the present disclosure, a single core 10 is arranged at the center of cladding 20. A central axis 10$c$ of core 10 and a central axis 20$c$ of cladding 20 coincide with each other. In other words, core 10 and cladding 20 are arranged concentrically in the cross section. Such a configuration in which core 10 is arranged at the center of cladding 20 is desirable from a viewpoint of enhancing connectivity with a standard optical fiber. However, core 10 may be configured to be arranged at a position other than the center of cladding 20, or a plurality of cores 10 may be configured to be arranged inside a same cladding 20.

A radius r10 of core 10 is, for example, 3 μm to 6 μm. Cladding 20 includes a first cladding 21 (optical cladding) surrounding core 10, and a second cladding 22 (common physical cladding) surrounding first cladding 21. Each of an outer peripheral surface of first cladding 21 and an outer peripheral surface of second cladding 22 has a circular shape. First cladding 21 is in contact with the outer peripheral surface of core 10. Second cladding 22 is in contact with the outer peripheral surface of first cladding 21. A radius r21 of first cladding 21 is, for example, such that r21/r10 is 2.5 to 4. A radius of second cladding 22 is, for example, 30 μm to 63 μm, or 63 μm to 125 μm. In a configuration in which a plurality of cores 10 are arranged inside a same cladding 20, when second cladding 22 has a radius of 63 μm to 125 μm, more cores 10 can be arranged.

Each of the pair of low-refractive-index portions 40 has a circular shape in a cross-section. Low-refractive-index portions 40 each have an ellipticity of 5% or less, 3% or less, 2% or less, 1% or less, or even 0%. One pair of low-refractive-index portions 40 are provided for each of cores 10. The pair of low-refractive-index portions 40 are arranged point-symmetrically with respect to central axis 10$c$ of a corresponding one of cores 10 in the cross section. One pair of low-refractive-index portions 40 and a corresponding one of cores 10 that are integrated with one another constitute a polarization maintaining core 50.

Polarization maintaining core 50 has a first polarization maintaining direction perpendicular to a straight line that connects central axes 40$c$ of the pair of low-refractive-index portions 40 to each other and a second polarization maintaining direction parallel to the straight line that connects the pair of central axes 40$c$ to each other in the cross section. The central axis of polarization maintaining core 50 coincides with central axis 10$c$ of core 10.

Only a portion of each of low-refractive-index portions 40 is arranged inside core 10. The remaining portion of each of low-refractive-index portions 40 protrudes from core 10 and is arranged inside first cladding 21. Each of low-refractive-index portions 40 is in contact with not only core 10 but also first cladding 21. That is, when a radius of core 10 is r10, a radius of each of low-refractive-index portions 40 is r40, and a distance between central axis 10$c$ of core 10 and central axis 40$c$ of each of low-refractive-index portions 40 is d, $r10<r40+d$ is satisfied. The outer peripheral surface of core 10 has a circular shape except for low-refractive-index portions 40, however, not completely circular shape. Accordingly, radius r10 of core 10 is defined as a distance between the central axis of core 10 and the outer peripheral surface of core 10 in a direction perpendicular to a line segment that connects the centers of two low-refractive-index portions to each other in the cross section.

A ratio r40/r10 of radius r40 of each of low-refractive-index portions 40 to radius r10 of core 10 is, for example, 0.8 to 2.0. (d−r40)/r10 is preferably 0.2 to 0.6, more preferably 0.3 to 0.5.

For example, it is preferable to satisfy the following conditions: 3.5 μm≤r10≤4.0 μm, 0.2≤(d−r40)/r10≤0.4, 0.8≤r40/r10≤2.0, 2.5≤r21/r10≤3.6, an average value of a relative refractive index difference of core 10 of 0.70% to 0.85% with first cladding 21 used as a reference, a relative refractive index difference of each of low-refractive-index portions 40 of about 0.0% with first cladding 21 used as a reference, and an average value of a relative refractive index difference of core 10 of 0.40% to 0.63% with second cladding 22 used as a reference. When the conditions above are satisfied, a birefringence of a fundamental mode is about $2\times10^{5}$ at 1310 nm, and a connection loss (Gaussian beam coupling loss) is suppressed to about 0.35 dB when a Gaussian beam having an MFD of 8.6 μm is coupled to an optical fiber.

For example, it is preferable to satisfy the following conditions: 3.5 μm≤r10≤4.0 μm, 0.4≤(d−r40)/r10≤0.6, 0.8≤r40/r10≤2.0, 2.5≤r21/r10≤3.7, an average value of a relative refractive index difference of core 10 of 0.50% to 0.65% with first cladding 21 used as a reference, a relative refractive index difference of each of low-refractive-index portions 40 of −0.2% to 0% with first cladding 21 used as a reference, and an average value of a relative refractive index difference of core 10 of 0.40% to 0.53% with second cladding 22 used as a reference. When the conditions above are satisfied, a birefringence of a fundamental mode is about $1\times10^{5}$ at 1310 nm, and a connection loss (Gaussian beam coupling loss) is suppressed to about 0.1 dB when a Gaussian beam having an MFD of 8.6 μm is coupled to an optical fiber.

A refractive index distribution of core 10 has circular symmetry with respect to central axis 10*c* except for low-refractive-index portions 40 inside core 10. Cladding 20 and low-refractive-index portions 40 have refractive indices lower than a refractive index (average value) of core 10. First cladding 21 has a refractive index lower than a refractive index of second cladding 22.

Each of low-refractive-index portions 40 has a refractive index equal to or less than the refractive index of first cladding 21. A relative refractive index difference of each of low-refractive-index portions 40 with first cladding 21 used as a reference is −2% to −1%, −1% to −0.5%, −0.5% to −0.3%, −0.3% to −0.1%, or −0.1% to 0.1%. An average value of a relative refractive index difference of core 10 with first cladding 21 used as a reference is 0.3% to 0.5%, or 0.5% to 1.0%. Radius r10 is 3 μm to 6 μm.

When a radius of core 10 is r10, a radius of each of low-refractive-index portions 40 is r40, a radius of first cladding 21 is r21, a relative refractive index difference of core 10 with a refractive index of second cladding 22 used as a reference is Δ10, a relative refractive index difference of each of low-refractive-index portions 40 with the refractive index of second cladding 22 used as a reference is Δ40, a relative refractive index difference of first cladding 21 with the refractive index of second cladding 22 used as a reference is Δ21, and a distance between central axis 10*c* of core 10 and central axis 40*c* of each of low-refractive-index portions 40 is d, the following equation is satisfied.

0.8≤r40/r10≤2.0

0.2≤(d−r21)/r10≤0.6

0.5%≤Δ10−Δ40≤2.0%

0.5%≤Δ10−Δ21≤2.0%

A first condition or a second condition expressed by inequalities below is further satisfied.

First condition:

3 μm≤r10≤6 μm 2.5≤r21/r10≤3.6

0.70%≤Δ10−Δ40≤0.85%

0.70%≤Δ10−Δ21≤0.85%

0.40%≤Δ10≤0.63%

Δ21≤0%

Δ40≤0%

Second condition:

3 μm≤r10≤6 μm 2.5≤r21/r10≤3.7

0.50%≤Δ10−Δ40≤0.65%

0.50%≤Δ10−Δ21≤0.85%

0.40%≤Δ10≤0.53%

Δ21≤0%

Δ40≤0%

A difference between the thermal expansion coefficient of core 10 and the thermal expansion coefficient of each of low-refractive-index portions 40 is $5\times10^{-7}$/K or less, $2\times10^{-7}$/K or less, or $1\times10^{-7}$/K or less. A difference between the thermal expansion coefficient of core 10 and the thermal expansion coefficient of first cladding 21 is $5\times10^{-7}$/K or less, $2\times10^{-7}$/K or less, or $1\times10^{-7}$/K or less. Since the difference in the thermal expansion coefficient is suppressed, breakage or rupture of the optical fiber preform is suppressed. A difference between the thermal expansion coefficient of first cladding 21 and the thermal expansion coefficient of each of low-refractive-index portions 40 may also be $5\times10^{-7}$/K or less.

Core 10, first cladding 21, second cladding 22, and low-refractive-index portions 40 are each made of glass. Core 10 is made of glass. First cladding 21, second cladding 22, and low-refractive-index portions 40 are made of glass having compositions different from a composition of core 10. For example, silica glass containing a trace amount of chlorine (Cl) or fluorine (F) is included in a glass that is different in composition from silica glass that does not contain chlorine (Cl) or fluorine (F). Silica glass containing $GeO_2$ is also included in a glass that is different in composition from silica glass that does not contain $GeO_2$. First cladding 21 and second cladding 22 may have the same composition as each other.

Polarization-maintaining optical fiber 1 has a polarization crosstalk of −29.4 dB to −5.98 dB at any wavelength within the range of 850 nm to 1625 nm when a length in the longitudinal direction is 10 cm to 1 m, 1 m to 5 m, or 5 m to 10 m. In this case, a polarization crosstalk may be −26.4 dB or more. A polarization crosstalk may be −7.2 dB or less, −9.1 dB or less, −10.8 dB or less, −12.3 dB or less, −15.5 dB or less, −16.3 dB or less, or −19.4 dB or less.

In polarization-maintaining optical fiber 1, a maximum value of an absolute value of a residual stress in the cross section is 100 MPa or less, 50 MPa or less, 20 MPa or less, or 10 MPa or less. A birefringence is $5\times10^{-6}$ to $5\times10^{-5}$ or $1\times10^{-5}$ to $3\times10^{-5}$ at any wavelength with the range of 850 nm to 1625 nm.

In the cross section, when a local coordinate system of each of cores 10 is defined as follows: an origin is the center of cores 10 (central axis 10*c*), an X axis is an axis parallel to a straight line that connects the centers (central axes 40*c*) of two low-refractive-index portions 40 to each other and passing through the origin, and a Y axis is an axis perpendicular to straight line and passing through the origin, and a near-field intensity distribution is I (X, Y), a mode-field flattening f defined by equations below is 0.05 to 0.40, 0.05 to 0.30, or 0.05 to 0.25 at any wavelength within the range of 850 nm to 1625 nm.

$$f = 1 - \frac{\min(D4\sigma_X, D4\sigma_Y)}{\max(D4\sigma_X, D4\sigma_Y)} \quad \text{[Math. 5]}$$

$$D4\sigma_X = 4\sqrt{\frac{\int\int I(X, Y)(X - \overline{X})^2 dXdY}{\int\int I(X, Y)dXdY}}$$

$$D4\sigma_Y = 4\sqrt{\frac{\int\int I(X, Y)(Y - \overline{Y})^2 dXdY}{\int\int I(X, Y)dXdY}}$$

$$\overline{X} = \frac{\int\int I(X, Y)XdXdY}{\int\int I(X, Y)dXdY}$$

$$\overline{Y} = \frac{\int\int I(X, Y)YdXdY}{\int\int I(X, Y)dXdY}$$

Here, $$(\overline{X}, \overline{Y}) \quad \text{[Math. 6]}$$

the above notation denotes a center of gravity of I (X, Y), $D4\sigma_X$ denotes a D4σ beam width in X axis direction, and $D4\sigma_Y$ denotes a D4σ beam width in Y axis direction. A magnitude of birefringence can be measured by, for example, a method described in JIS C6872:2008 "Measurement methods for beat length of polarization-maintaining optical fibers". In order to achieve a birefringence of $1\times10^{-5}$ or more, f≥0.05 is required. For a Gaussian beam coupling loss to be 0.35 dB or less, f≤0.40 is required, for a Gaussian beam coupling loss to be 0.2 dB or less, f≤0.30 is required, and for a Gaussian beam coupling loss to be 0.1 dB or less, f≤0.25 is required.

A mode-field average diameter defined by the following equation is 3 μm to 12 μm, or 8.2 μm to 9.6 μm, at a wavelength of 1310 nm.

$$MFD_{avg} = \sqrt{\frac{D4\sigma_X^2 + D4\sigma_Y^2}{2}} = 2\sqrt{2}\sqrt{\frac{\int\int I(X, Y)\left[(X - \overline{X})^2 + (Y - \overline{Y})^2\right]dXdY}{\int\int I(X, Y)dXdY}} \quad \text{[Math. 7]}$$

When mode-field flattening f is zero, an $MFD_{avg}$ is equal to an MFD defined by a second moment width of a near-field pattern, which is called the MFD of Petermann I. When $MFD_{avg}$ is in the above range, it is possible to suppress a connection loss due to MFD mismatch with a general single-mode optical fiber.

In one example of polarization-maintaining optical fiber 1, core 10 is made of silica glass containing $GeO_2$. Cladding and low-refractive-index portions 40 are made of silica glass containing no $GeO_2$ or silica glass having a $GeO_2$ content less than a $GeO_2$ content of core 10. Accordingly, it is possible to provide appropriate relative refractive index differences between core 10 and cladding 20, and between core 10 and each of low-refractive-index portions 40, respectively while reducing the total amount of additives used in core 10, cladding 20, and low-refractive-index portions 40.

In this example, core 10, cladding 20 and low-refractive-index portions 40 may include chlorine. A content of chlorine may be 0.1% to 0.5%, 0.5% to 2.0%, or 2.0% to 10% in terms of mass fraction. By containing chlorine, an absorption loss of light due to an OH group in the glass can be reduced.

Low-refractive-index portions 40 may contain fluorine of 0.1% to 0.5%, 0.5% to 2.0%, or 2.0% to 10% or less in terms of mass fraction. By containing fluorine, a sufficient relative refractive index difference can be provided between core 10 and each of low-refractive-index portions 40. Cladding 20 may contain fluorine of 0.1% to 0.5%, 0.5% to 2.0%, or 2.0% to 10% in terms of mass fraction. By containing fluorine, a sufficient relative refractive index difference can be provided between core and cladding 20.

Core 10, cladding 20, and low-refractive-index portions 40 may not contain a $B_2O_3$. An upper limit of a content (concentration) of $B_2O_3$ is preferably, in terms of mass fraction, 1% or less, more preferably 0.1% or less, and most preferably no $B_2O_3$ is contained. This reduces differences in thermal expansion coefficient between materials of core 10, cladding 20, and low-refractive-index portions 40, thereby avoiding manufacturing difficulties.

In another example of polarization-maintaining optical fiber 1, core 10 is made of silica glass that does not contain $GeO_2$. Cladding 20 and low-refractive-index portions 40 are made of silica glass containing fluorine. Since core 10 does not contain $GeO_2$, a core portion is less likely to be damaged when a hole is formed in the core portion by grinding, and more stable grinding can be performed. Therefore, the manufacturing is further facilitated.

In this example, core 10 may contain chlorine. A content of chlorine may be 0.1% to 0.5%, 0.5% to 2.0%, or 2.0% to 10% in terms of mass fraction. By containing chlorine, an absorption loss of light due to an OH group in the glass can be reduced.

Low-refractive-index portions 40 may contain fluorine of 0.1% to 0.5%, 0.5% to 2.0%, or 2.0% to 10% in terms of mass fraction. By containing fluorine, a sufficient relative refractive index difference can be provided between core 10 and each of low-refractive-index portions 40. Cladding 20 may contain fluorine of 0.1% to 0.5%, 0.5% to 2.0%, or 2.0% to 10% or less in terms of mass fraction. By containing fluorine, a sufficient relative refractive index difference can be provided between core 10 and cladding 20.

Core 10, cladding 20, and low-refractive-index portions 40 may not contain $B_2O_3$. An upper limit of a content of $B_2O_3$ is preferably, in terms of mass fraction, 1% or less, more preferably 0.1% or less, and most preferably no $B_2O_3$ is contained. This reduces differences in thermal expansion coefficient between materials of core 10, cladding 20, and low-refractive-index portions 40, thereby avoiding manufacturing difficulties.

Figure 8:
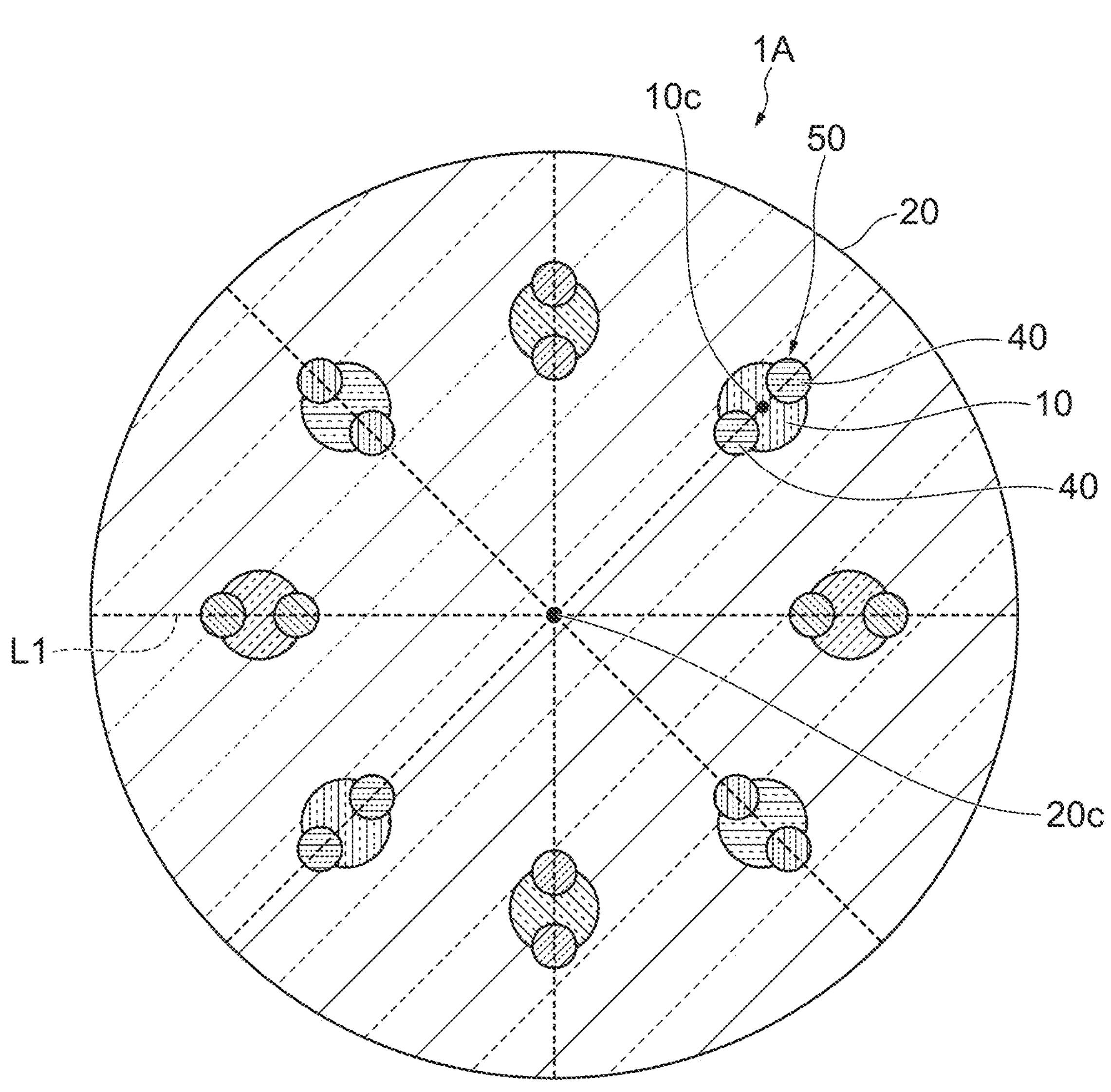
FIG. 8 is a cross-sectional view of a polarization-maintaining optical fiber according to a first modification.

FIG. 8 is a cross-sectional view of a polarization-maintaining optical fiber according to a first modification. As illustrated in FIG. 8, a polarization-maintaining optical fiber 1A according to the first modification is different from polarization-maintaining optical fiber 1 in that a plurality of cores 10 and a plurality of pairs of low-refractive-index portions 40 are included. That is, polarization-maintaining optical fiber 1A includes a plurality of polarization maintaining cores 50. This allows polarization-maintaining optical fiber 1A to propagate a plurality of polarization-maintaining light beams.

Central axes 10*c* are not coincident with central axis 20*c* of cladding 20. The plurality of polarization maintaining cores 50 are arranged in such a manner as to have two or more-fold rotational symmetry with respect to central axis 20*c* of cladding 20 in the cross section. The plurality of polarization maintaining cores 50 are arranged in such a manner that positions and polarization maintaining directions of polarization maintaining cores 50 have two or more-fold rotational symmetry with respect to central axis 20*c*. This allows polarization-maintaining optical fiber 1A to easily perform optical coupling to grating couplers arranged in such a manner as to have two or more-fold rotational symmetry.

In this modification, eight polarization maintaining cores 50 are arranged point-symmetrically with respect to central axis 20*c*. Central axes 10*c* of cores 10 are located at distances equal to each other from central axis 20*c*. Polarization-maintaining optical fiber 1A has 8-fold symmetry. In other words, polarization-maintaining optical fiber 1A coincides with itself when rotated by 45 degrees (=360 degrees/8) around the central axis.

A pair of low-refractive-index portions 40 in each of polarization maintaining cores 50 are arranged side by side along a straight line L1 connecting central axis 10*c* and central axis 20*c*. Central axis 40*c* (see FIG. 7) of each of low-refractive-index portions 40 is arranged on straight line L1. A first polarization maintaining direction of each of polarization maintaining cores 50 is perpendicular to straight line L1, and a second polarization maintaining direction is parallel to straight line L1. Also in polarization-maintaining optical fiber 1A, the pair of low-refractive-index portions 40 in each of polarization maintaining cores 50 have point symmetry with respect to central axis 10*c*.

Figure 9:
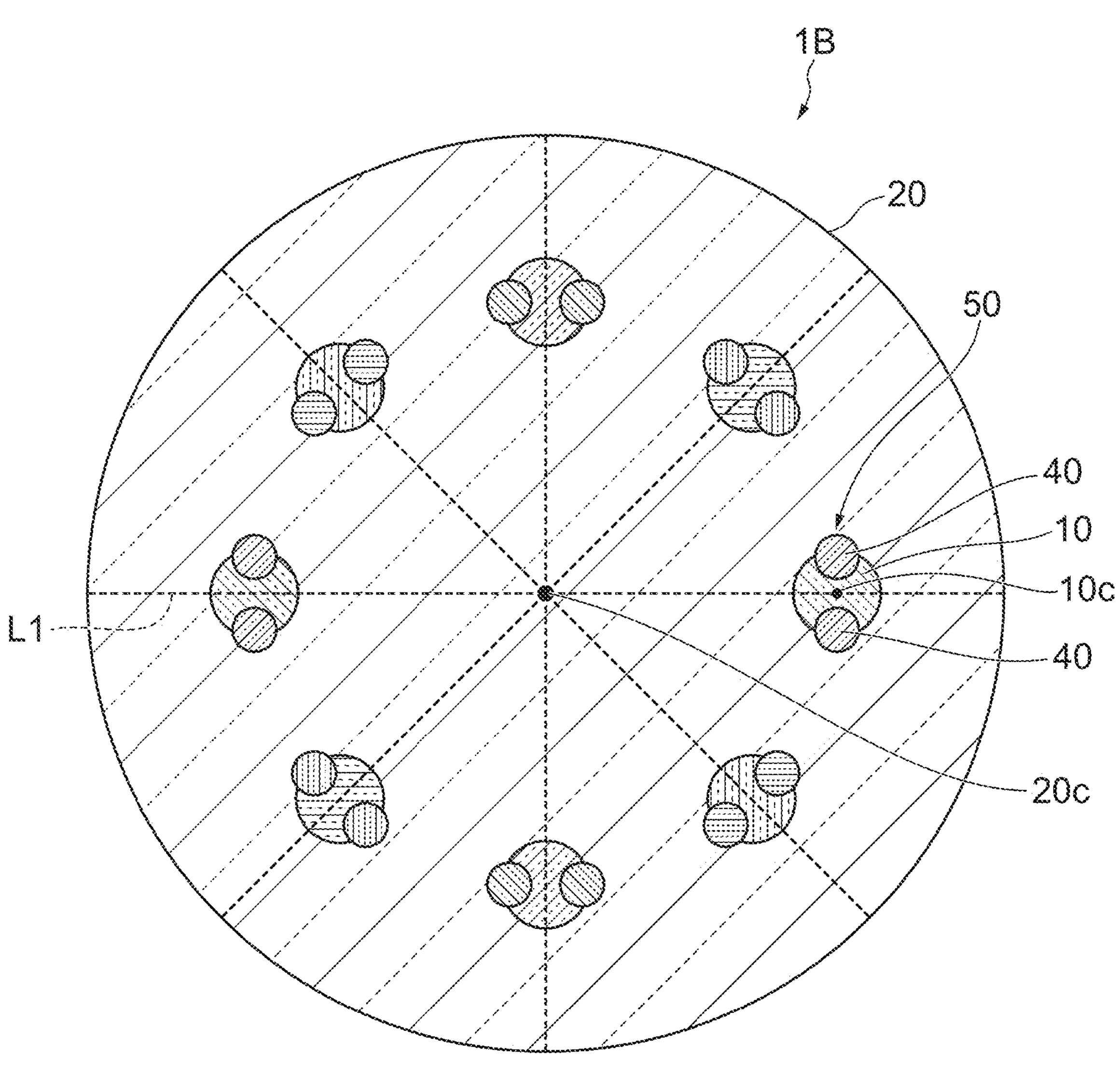
FIG. 9 is a cross-sectional view of a polarization-maintaining optical fiber according to a second modification.

FIG. 9 is a cross-sectional view of a polarization-maintaining optical fiber according to a second modification. As illustrated in FIG. 9, a polarization-maintaining optical fiber 1B according to the second modification is different from polarization-maintaining optical fiber 1A in the arrangement of low-refractive-index portions 40. In polarization-maintaining optical fiber 1B, a first polarization maintaining direction of each of polarization maintaining cores 50 is parallel to straight line L1. Central axes 40*c* (see FIG. 7) of low-refractive-index portions 40 are not arranged on straight line L1. Inside each of cores 10, a pair of low-refractive-index portions 40 are arranged so as to have line symmetry with respect to straight line L1.

Also in polarization-maintaining optical fiber 1B, as in polarization-maintaining optical fiber 1A, a plurality of polarization maintaining cores 50 are arranged in such a manner that positions and first polarization maintaining directions of polarization maintaining cores 50 have two or more-fold rotational symmetry with respect to central axis 20*c*. Also in polarization-maintaining optical fiber 1B, the pair of low-refractive-index portions 40 in each of polarization maintaining cores 50 have point symmetry with respect to central axis 10*c*.

Figure 10:
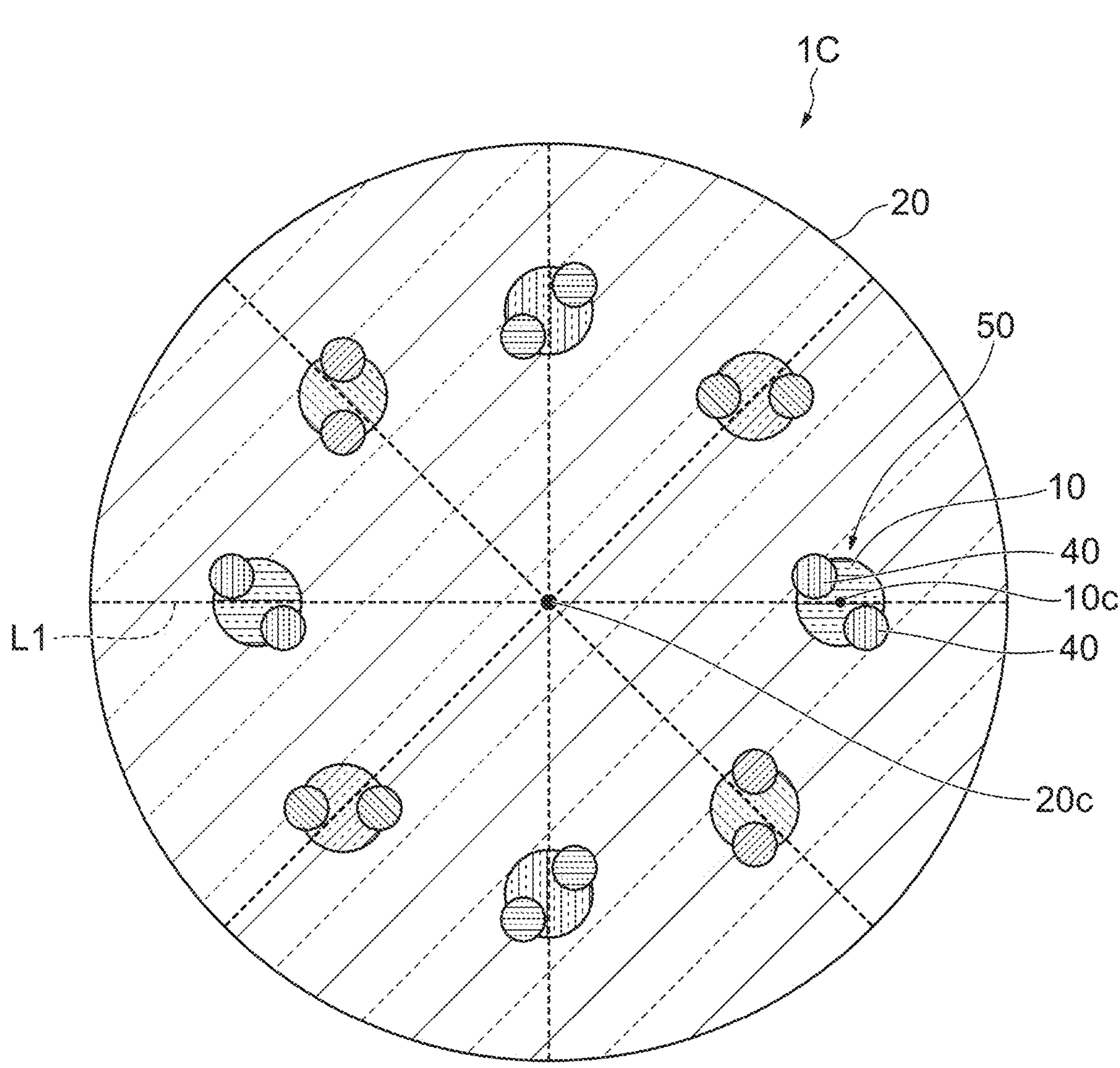
FIG. 10 is a cross-sectional view of a polarization-maintaining optical fiber according to a third modification.

FIG. 10 is a cross-sectional view of a polarization-maintaining optical fiber according to a third modification. As illustrated in FIG. 10, a polarization-maintaining optical fiber 1C according to the third modification is different from polarization-maintaining optical fiber 1A in the arrangement of low-refractive-index portions 40. In polarization-maintaining optical fiber 1C, first polarization maintaining directions of polarization maintaining cores 50 are inclined at angles equal to each other with respect to straight line L1. Central axis 40*c* (see FIG. 7) of each of low-refractive-index portions 40 is not arranged on straight line L1. A pair of low-refractive-index portions 40 in each of polarization maintaining cores 50 has no line symmetry with respect to straight line L1.

Also in polarization-maintaining optical fiber 1C, as in polarization-maintaining optical fiber 1A, a plurality of polarization maintaining cores 50 are arranged in such a manner that positions and first polarization maintaining directions of polarization maintaining cores 50 have two or more-fold rotational symmetry with respect to central axis 20*c*. The pair of low-refractive-index portions 40 in each of polarization maintaining cores 50 have point symmetry with respect to central axis 10*c*.

Figure 11:
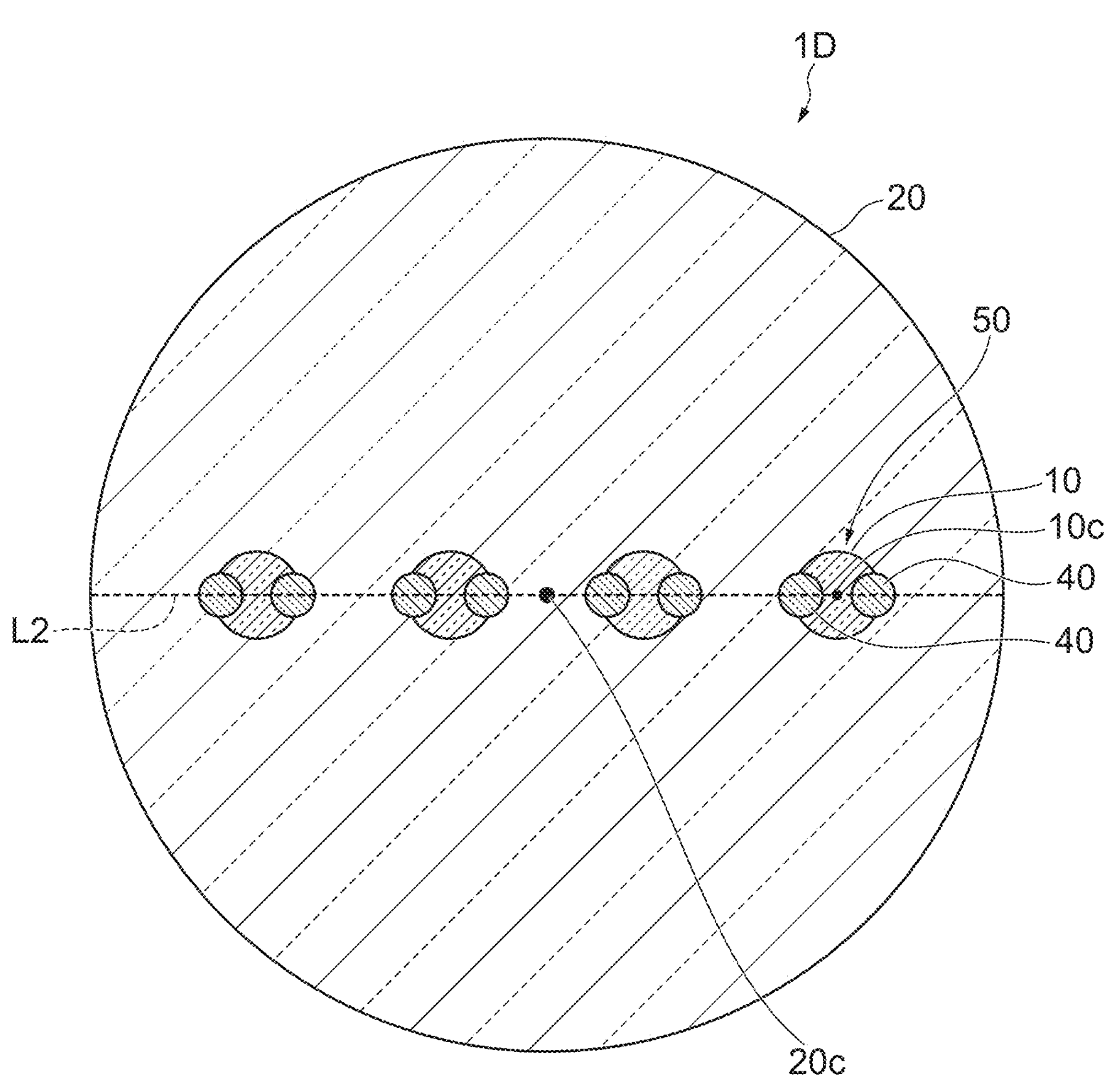
FIG. 11 is a cross-sectional view of a polarization-maintaining optical fiber according to a fourth modification.

FIG. 11 is a cross-sectional view of a polarization-maintaining optical fiber according to a fourth modification. As illustrated in FIG. 11, a polarization-maintaining optical fiber 1D according to the fourth modification is different from polarization-maintaining optical fiber 1A in that all polarization maintaining cores 50 are arranged such that central axes 10*c* of polarization maintaining cores 50 are on a single straight line L2 passing through central axis 20*c* of cladding 20.

In polarization-maintaining optical fiber 1D, a plurality of polarization maintaining cores 50 are arranged such that first polarization maintaining directions of all polarization maintaining cores 50 are parallel to each other. This allows polarization-maintaining optical fiber 1D to easily perform optical coupling to grating couplers, light input and output ends of a planar waveguide, or the like which are arranged such that the first polarization maintaining directions are parallel to each other.

Central axes 10*c* are not coincident with central axis 20*c* of cladding 20. The plurality of polarization maintaining cores 50 are arranged in such a manner that positions and the first polarization maintaining directions of polarization maintaining cores 50 have two or more-fold rotational symmetry with respect to central axis 20*c*. This allows polarization-maintaining optical fiber 1D to easily perform optical coupling to grating couplers arranged in such a manner as to have two or more-fold rotational symmetry.

In this modification, four polarization maintaining cores 50 are arranged point-symmetrically with respect to central axis 20*c*. Polarization-maintaining optical fiber 1D has two-fold symmetry. That is, polarization-maintaining optical fiber 1D coincides with itself when rotated by 180 degrees (=360 degrees/2) around the central axis.

In the cross section, the plurality of polarization maintaining cores 50 are arranged in a row. In this modification, four polarization maintaining cores 50 are arranged in a row at equal intervals. Central axes 40*c* (see FIG. 7) of all low-refractive-index portions 40 are also arranged on the single straight line L2. The first polarization maintaining directions of polarization maintaining cores 50 are perpendicular to straight line L2.

Figure 12:
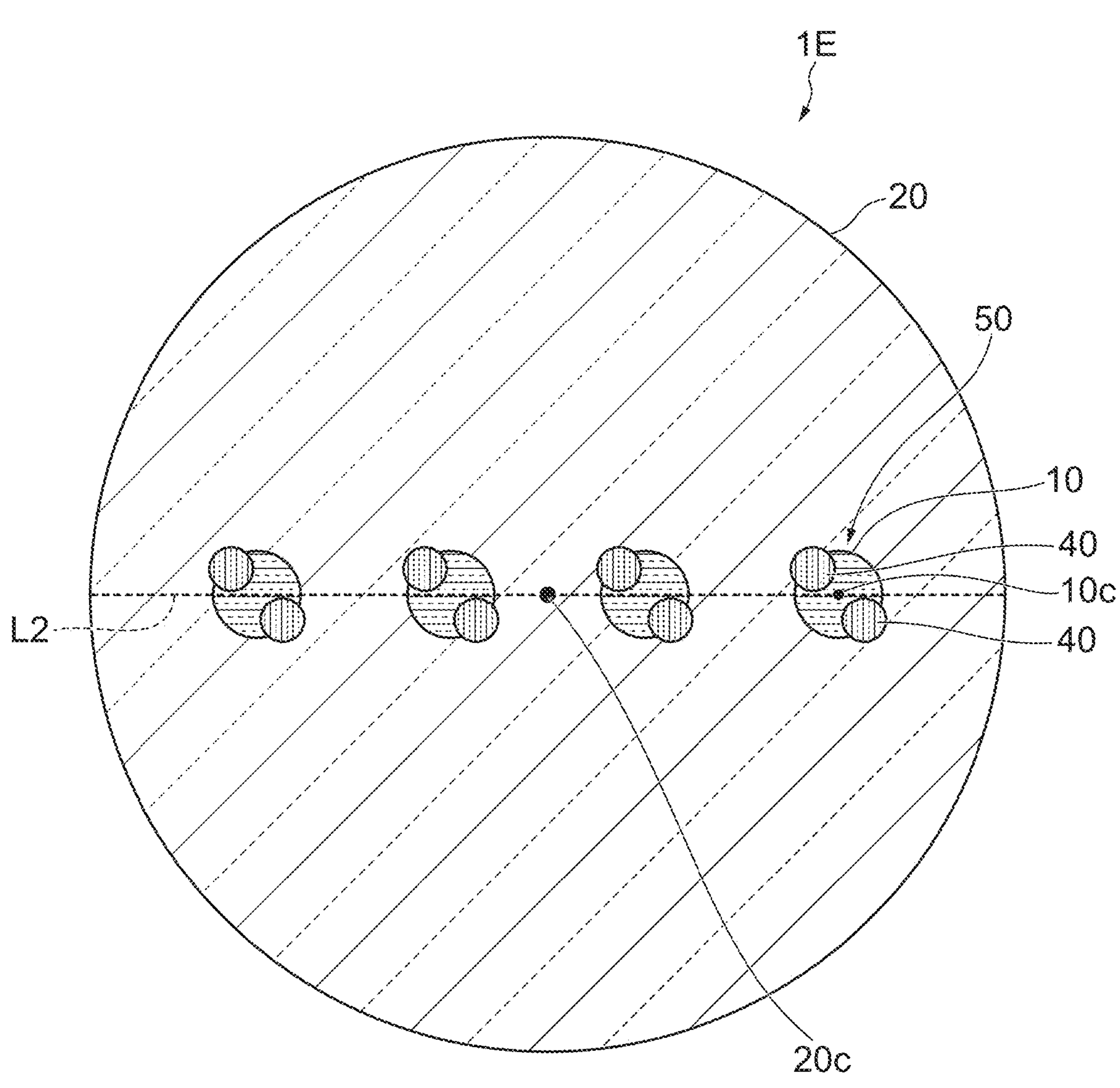
FIG. 12 is a cross-sectional view of a polarization-maintaining optical fiber according to a fifth modification.

FIG. 12 is a cross-sectional view of a polarization-maintaining optical fiber according to a fifth modification. As illustrated in FIG. 12, a polarization-maintaining optical fiber 1E according to the fifth modification is different from polarization-maintaining optical fiber 1D in the arrangement of low-refractive-index portions 40. In polarization-maintaining optical fiber 1E, central axes 40*c* (see FIG. 7) of low-refractive-index portions 40 are not arranged on straight line L2. First polarization maintaining directions of polarization maintaining cores 50 are inclined with respect to straight line L2. Also in polarization-maintaining optical fiber 1E, a plurality of cores 10 are arranged such that the first polarization maintaining directions of all polarization maintaining cores 50 are parallel to each other.

Figure 13:
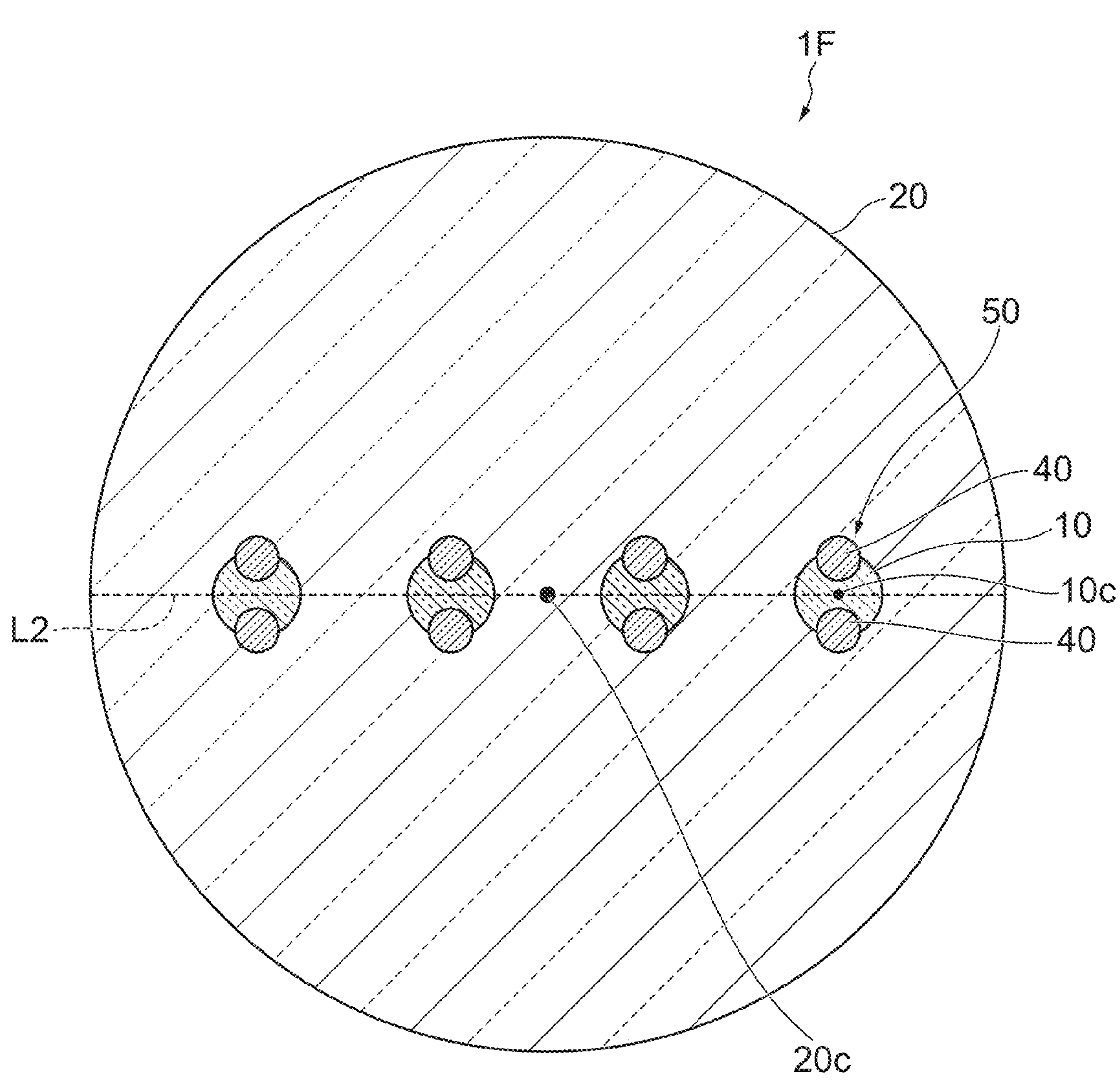
FIG. 13 is a cross-sectional view of a polarization-maintaining optical fiber according to a sixth modification.

FIG. 13 is a cross-sectional view of a polarization-maintaining optical fiber according to a sixth modification. As illustrated in FIG. 13, a polarization-maintaining optical fiber 1F according to the sixth modification is different from polarization-maintaining optical fiber 1D in the arrangement of low-refractive-index portions 40. In polarization-maintaining optical fiber 1F, central axes 40*c* (see FIG. 7) of low-refractive-index portions 40 are not arranged on straight line L2. First polarization maintaining directions of polarization maintaining cores 50 are parallel to straight line L2. Also in polarization-maintaining optical fiber 1F, a plurality of polarization maintaining cores 50 are arranged such that the first polarization maintaining directions of all polarization maintaining cores 50 are parallel to each other.

Figure 14:
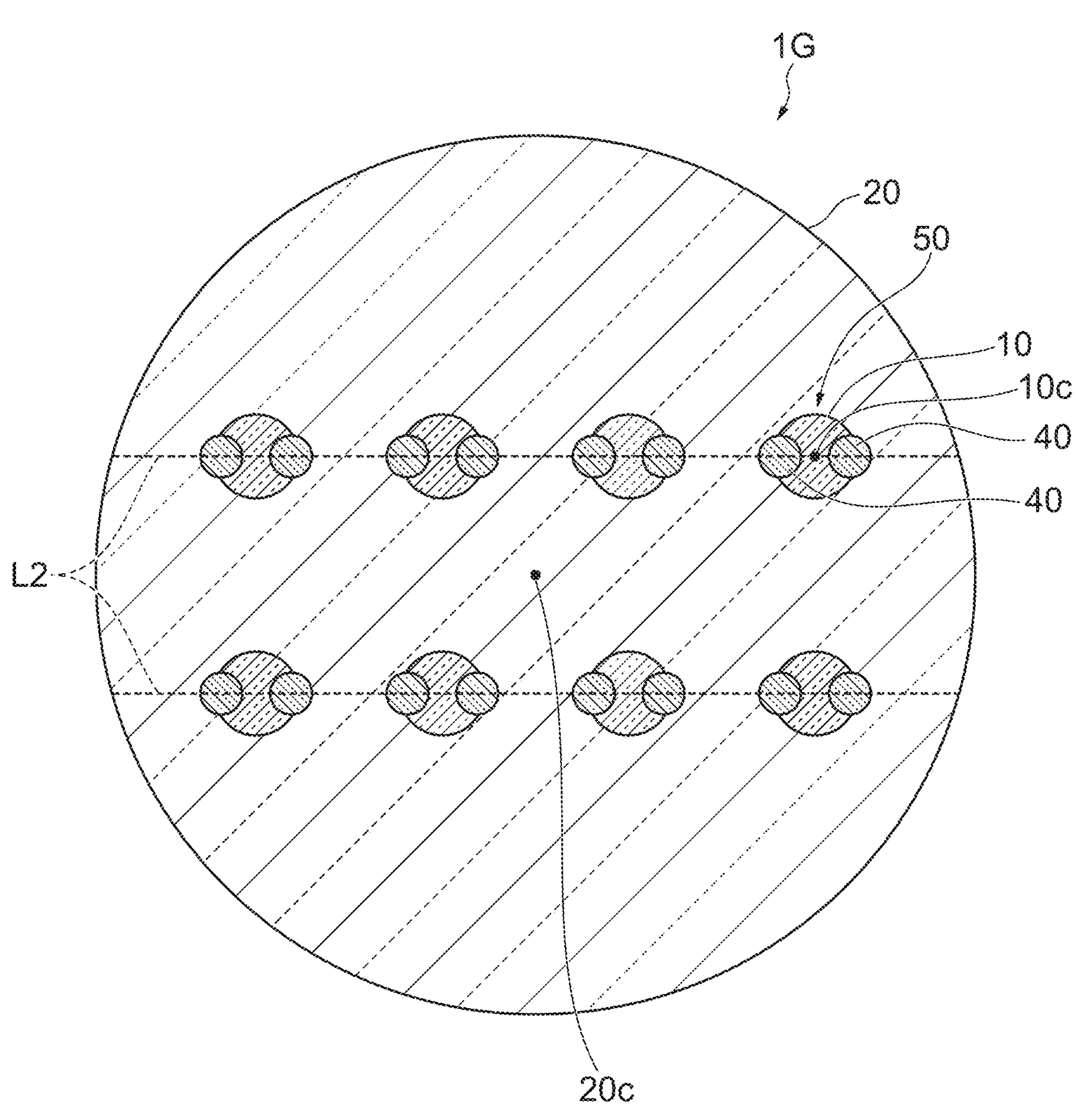
FIG. 14 is a cross-sectional view of a polarization-maintaining optical fiber according to a seventh modification.

FIG. 14 is a cross-sectional view of a polarization-maintaining optical fiber according to a seventh modification. As illustrated in FIG. 14, a polarization-maintaining optical fiber 1G according to the seventh modification is different from polarization-maintaining optical fiber 1D in that a plurality of polarization maintaining cores 50 are arranged in two rows instead of one row. In this modification, eight cores 10 are arranged in two rows of four cores 10 at equal intervals. A single straight line L2 passing through central axes 10*c* of all cores 10 in one row and a single straight line L2 passing through central axes 10*c* of all cores 10 in the other row are arranged in parallel to each other with central axis 20*c* of cladding 20 interposed therebetween. Central axes 40*c* (see FIG. 7) of all low-refractive-index portions are arranged on a corresponding one of straight lines L2. First polarization maintaining directions of polarization maintaining cores 50 are perpendicular to straight lines L2.

Also in polarization-maintaining optical fiber 1G, the plurality of polarization maintaining cores 50 are arranged such that the first polarization maintaining directions of all polarization maintaining cores 50 are parallel to each other. In the cross section, the plurality of polarization maintaining cores 50 are arranged in such a manner that positions and the first polarization maintaining directions of polarization maintaining cores 50 have two or more-fold rotational symmetry with respect to central axis 20*c*. Polarization-maintaining optical fiber 1G also has two-fold symmetry.

Figure 15:
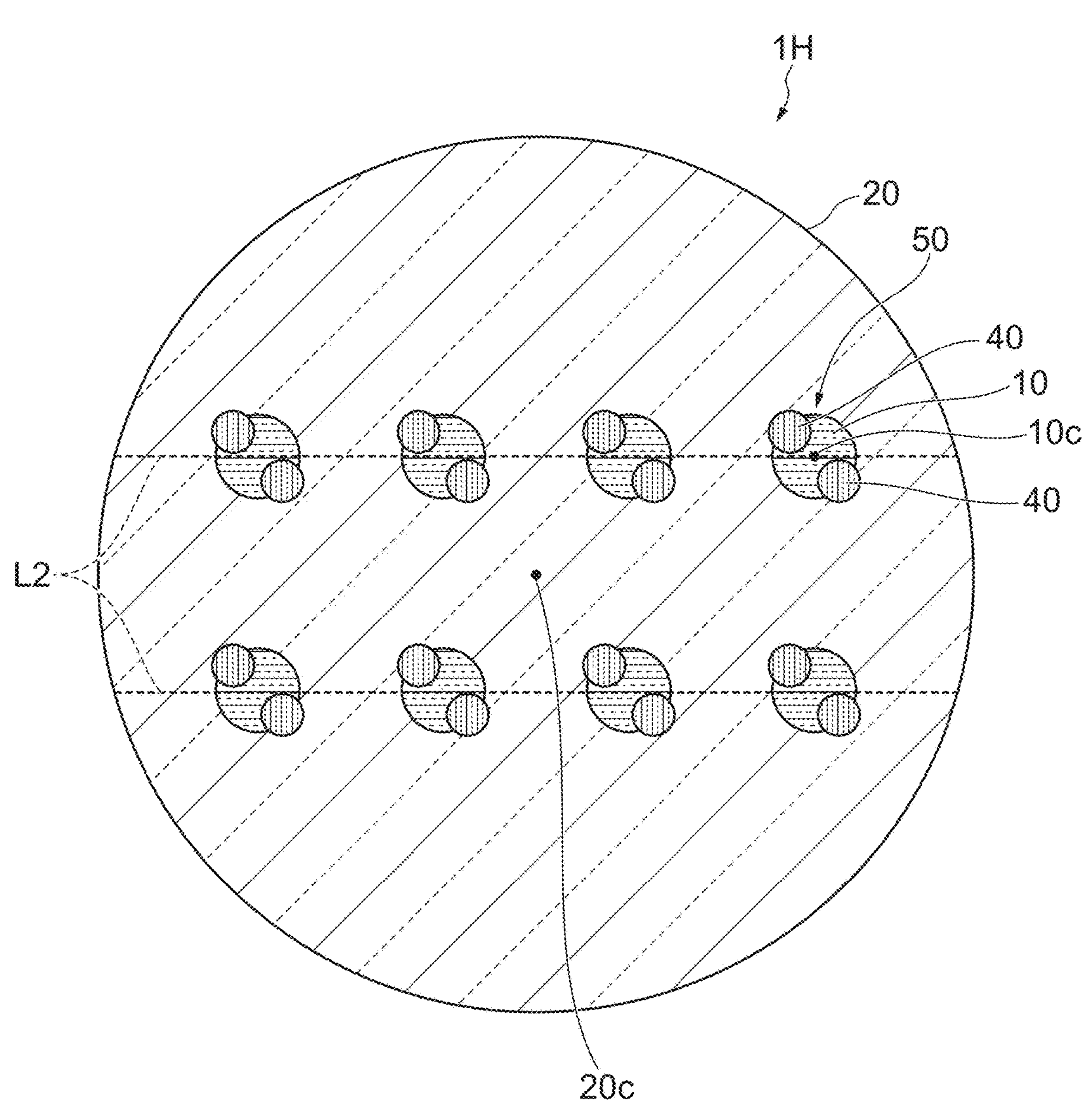
FIG. 15 is a cross-sectional view of a polarization-maintaining optical fiber according to an eighth modification.

FIG. 15 is a cross-sectional view of a polarization-maintaining optical fiber according to an eighth modification. As illustrated in FIG. 15, a polarization-maintaining optical fiber 1H according to the eighth modification is different from polarization-maintaining optical fiber 1G in the arrangement of low-refractive-index portions 40. In polarization-maintaining optical fiber 1H, central axes 40*c* (see FIG. 7) of low-refractive-index portions 40 are not arranged on a corresponding one of straight lines L2. Polarization maintaining directions of polarization maintaining cores 50 are inclined with respect to a corresponding one of straight lines L2. Also in polarization-maintaining optical fiber 1H, a plurality of polarization maintaining cores 50 are arranged such that corresponding polarization maintaining directions of all polarization maintaining cores 50 are parallel to each other.

Figure 16:
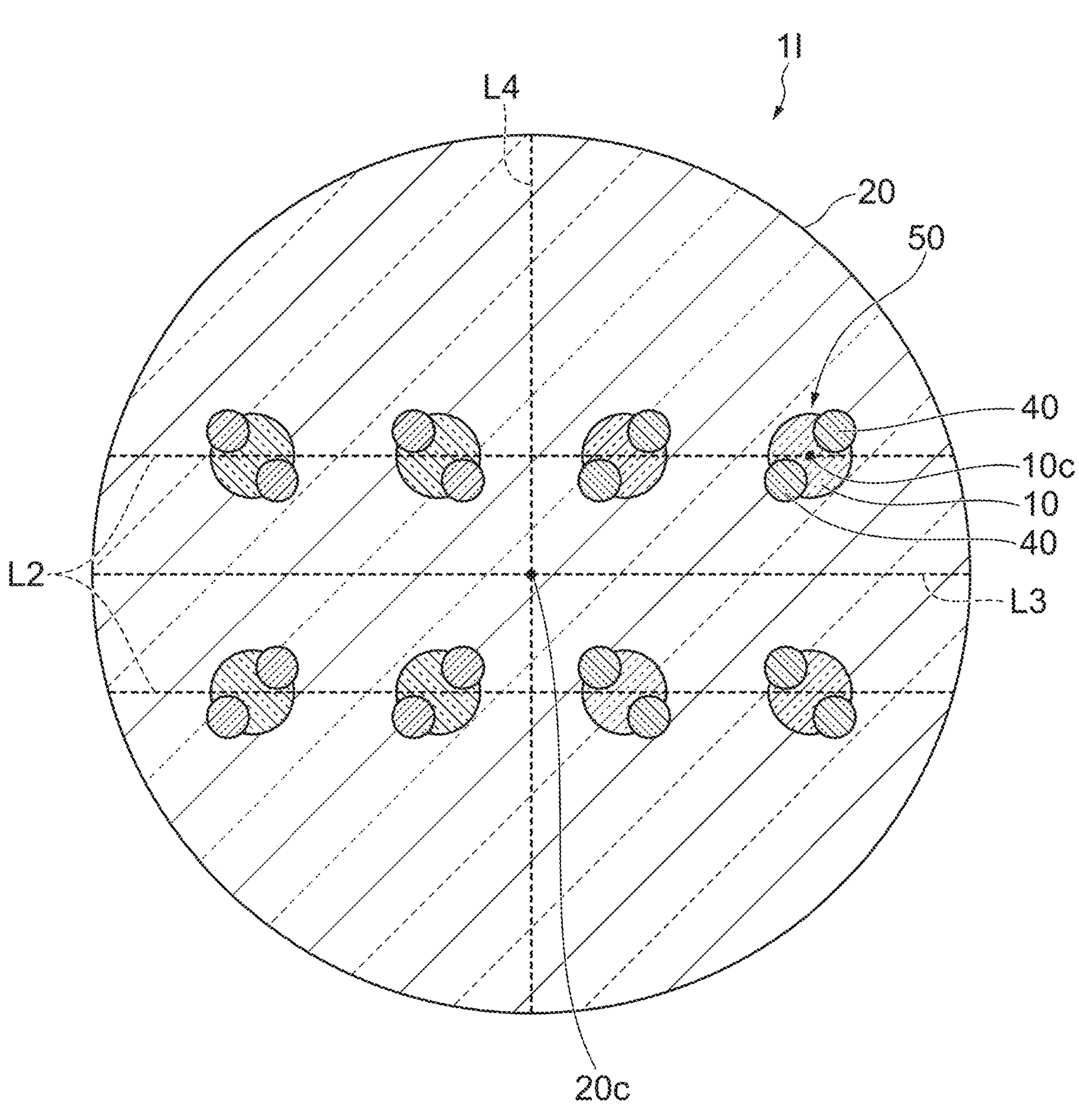
FIG. 16 is a cross-sectional view of a polarization-maintaining optical fiber according to a ninth modification.

FIG. 16 is a cross-sectional view of a polarization-maintaining optical fiber according to a ninth modification. As illustrated in FIG. 16, a polarization-maintaining optical fiber 1I according to the ninth modification is different from polarization-maintaining optical fiber 1G in the arrangement of low-refractive-index portions 40. In polarization-maintaining optical fiber 1I, central axes 40*c* (see FIG. 7) of low-refractive-index portions 40 are not arranged on a corresponding one of straight lines L2. Polarization maintaining directions of polarization maintaining cores 50 are inclined with respect to a corresponding one of straight lines L2. In polarization-maintaining optical fiber 1I, a plurality of polarization maintaining cores 50 are not arranged such that corresponding polarization maintaining directions of polarization maintaining cores 50 are parallel to each other.

Also in polarization-maintaining optical fiber 1I, the plurality of polarization maintaining cores 50 are arranged in such a manner that positions and the corresponding polarization maintaining directions of polarization maintaining cores 50 have two or more-fold rotational symmetry with respect to central axis 20*c*. Polarization-maintaining optical fiber 1I also has two-fold symmetry. The plurality of polarization maintaining cores 50 are arranged in such a manner that positions and corresponding polarization maintaining directions of polarization maintaining cores 50 have line symmetry with respect to a straight line L3 passing through central axis 20*c* of cladding 20 and parallel to a pair of straight lines L2. A plurality of cores 10 are arranged in such a manner that positions of cores 10 and the corresponding polarization maintaining directions of polarization maintaining core 50 have line symmetry with respect to a straight line L4 passing through central axis 20*c* of cladding 20 and perpendicular to the pair of straight lines L2. This allows polarization-maintaining optical fiber 1I to easily perform optical coupling to grating couplers arranged in such a manner that positions and polarization axes of the grating couplers have line symmetry with respect to straight line L3 and straight line L4.

Figure 17:
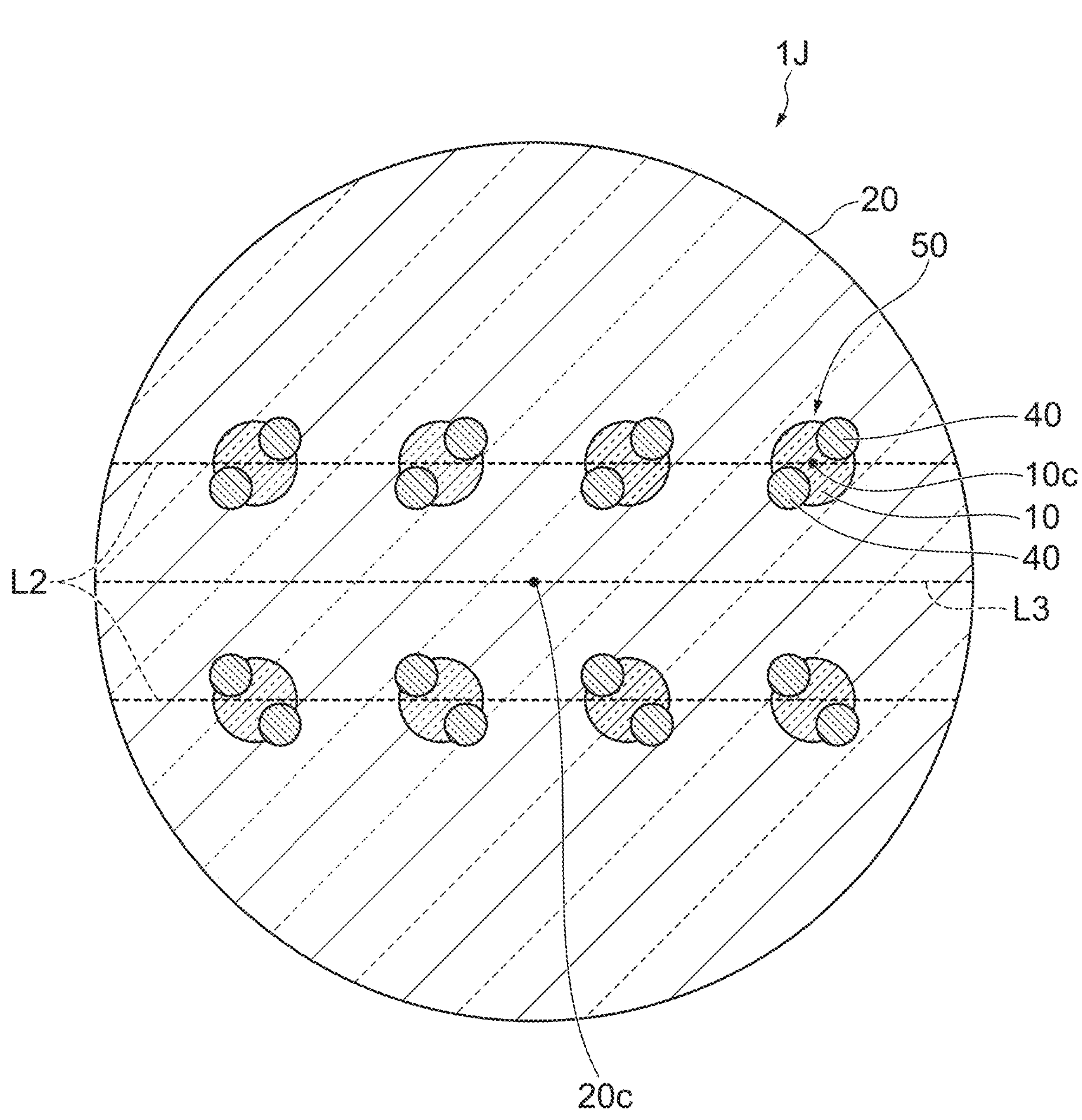
FIG. 17 is a cross-sectional view of a polarization-maintaining optical fiber according to a tenth modification.

FIG. 17 is a cross-sectional view of a polarization-maintaining optical fiber according to a tenth modification. As illustrated in FIG. 17, a polarization-maintaining optical fiber 1J according to the tenth modification is different from polarization-maintaining optical fiber 1G in the arrangement of low-refractive-index portions 40. In polarization-maintaining optical fiber 1J, central axes 40*c* (see FIG. 7) of low-refractive-index portions 40 are not arranged on a corresponding one of straight lines L2. Polarization maintaining directions of polarization maintaining cores 50 are inclined with respect to a corresponding one of straight lines L2. Corresponding polarization maintaining directions of a plurality of polarization maintaining cores 50 arranged on one straight line L2 are parallel to each other. Corresponding polarization maintaining directions of a plurality of polarization maintaining cores 50 arranged on the other straight line L2 are parallel to each other. The polarization maintaining directions of the plurality of polarization maintaining cores 50 arranged on one straight line L2 and the corresponding polarization maintaining directions of the plurality of polarization maintaining cores 50 arranged on the other straight line L2 intersect (here, are perpendicular to) each other.

Also in polarization-maintaining optical fiber 1J, the plurality of polarization maintaining cores 50 are arranged in such a manner that positions and polarization maintaining directions of polarization maintaining cores 50 have two or more-fold rotational symmetry with respect to central axis 20*c*. Polarization-maintaining optical fiber 1J also has two-fold symmetry. The plurality of polarization maintaining cores 50 are arranged in such a manner that positions and the polarization maintaining directions of polarization maintaining cores 50 have line symmetry with respect to straight line L3 passing through central axis 20*c* of cladding 20 and parallel to a pair of straight lines L2. This allows polarization-maintaining optical fiber 1J to easily perform optical coupling to grating couplers arranged in such a manner that positions and polarization axes of the grating couplers have line symmetry with respect to straight line L3.

The above-described polarization-maintaining optical fibers 1, 1A, 1B, 1C, 1D, 1E, 1F, 1G, 1H, 1I, and 1J (hereinafter referred to as polarization-maintaining optical fiber 1 and the like) are inferior to a normal polarization-maintaining optical fiber in polarization maintaining performance. Thus, bending at an extremely small bending radius may increase a polarization crosstalk and increase a polarization mode loss. Therefore, polarization-maintaining optical fiber 1 or the like may be fixed to a holding member such that a bending radius direction and polarization maintaining directions of all polarization maintaining cores 50 are perpendicular to each other or parallel to each other when polarization-maintaining optical fiber 1 and the like are bent at a radius of 10 mm or less.

Figure 18:
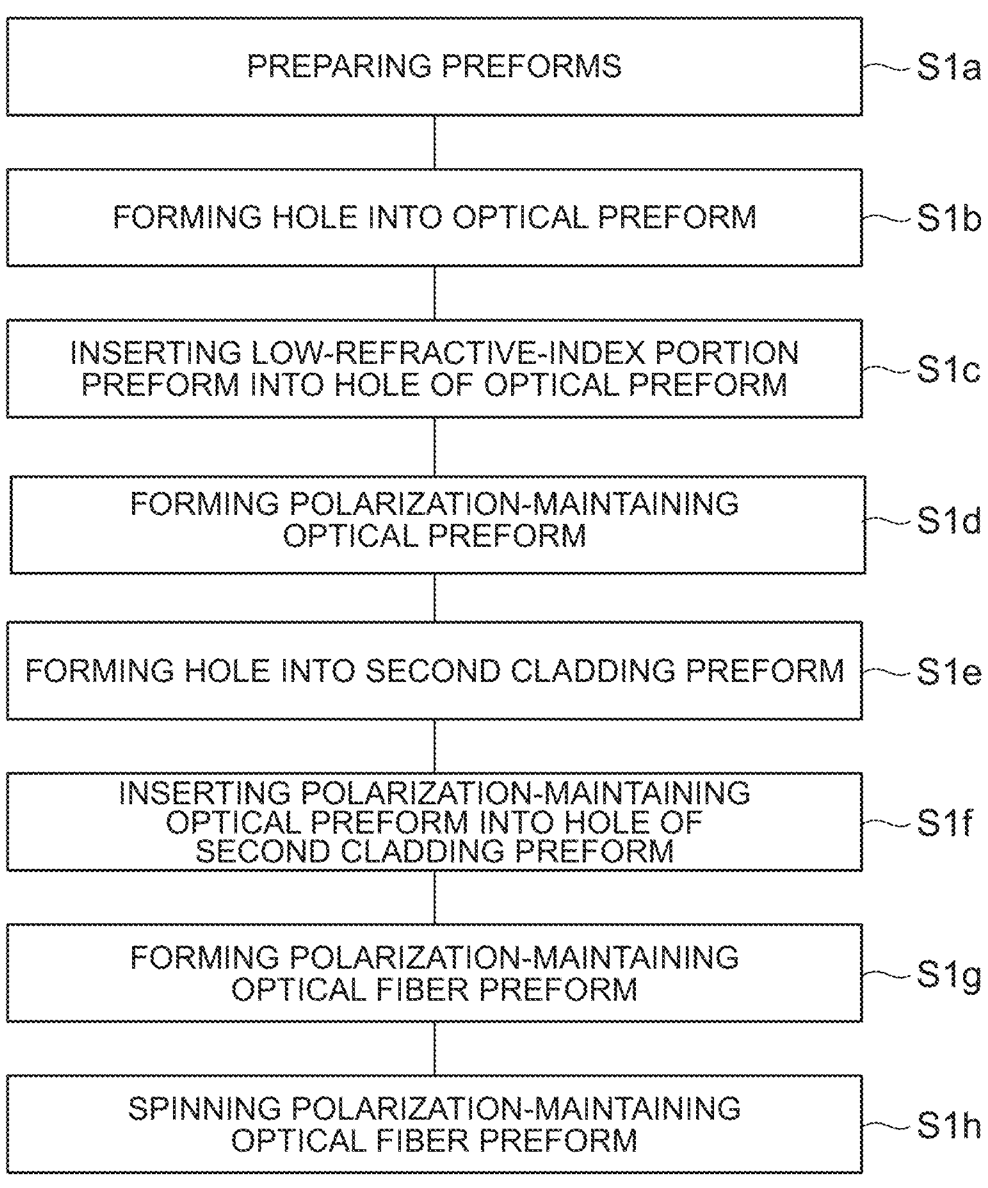
FIG. 18 is a flowchart illustrating a manufacturing method according to a first embodiment.

Next, a method of manufacturing polarization-maintaining optical fiber 1 and the like will be described. FIG. 18 is a flowchart illustrating a manufacturing method according to a first embodiment. In the manufacturing method according to the first embodiment, an optical preform including a core portion and a first cladding portion (optical cladding portion) is integrated with a low-refractive-index portion preform to form a polarization-maintaining optical preform, and then a second cladding portion (common physical cladding portion) is provided around the polarization-maintaining optical preform. As illustrated in FIG. 18, specifically, the manufacturing method according to the first embodiment includes a step S1*a*, a step S1*b*, a step S1*c*, a step S1*d*, a step S1*e*, a step S1*f*, a step S1*g*, and a step S1*h* described below. The manufacturing method of the first embodiment allows manufacture of all polarization-maintaining optical fibers such as polarization-maintaining optical fiber 1.

Step S1*a* is a step of preparing an optical preform, a second cladding preform (physical-cladding preform), and a low-refractive-index portion preform. In step S1*a*, an optical preform, a second cladding preform, and a low-refractive-index portion preform that are each made of glass and each have cylindrical symmetry with respect to the respective central axes are prepared. A core portion of the optical preform has a refractive index higher than each of a refractive index of the second cladding preform and a refractive index of the low-refractive-index portion preform. The second cladding preform is made of glass and has a thermal expansion coefficient that differs by $5\times10^{-7}$/K or less from a thermal expansion coefficient of the core portion. In the second cladding preform, an outer periphery has translational symmetry along a predetermined axis over a predetermined length. The second cladding preform has, for example, cylindrical symmetry. The low-refractive-index portion preform has a thermal expansion coefficient that differs by $5\times10^{-7}$/K or less, $2\times10^{-7}$/K or less, or $1\times10^{-7}$/K or less from each of thermal expansion coefficients of the core portion and the first cladding portion of the optical preform.

The optical preform is prepared, for example, through the steps of preparing a core preform and a first cladding preform (optical cladding preform), forming a hole for inserting the core preform into the first cladding preform, inserting the core preform into the hole, and integrating the core preform and the first cladding preform with each other by heating.

Step S1*b* is a step of forming a hole into the optical preform. In step S1*b*, a pair of holes for inserting the low-refractive-index portion preforms are formed into the optical preform prepared in step S1*a*. The holes each have a cylindrical shape and each have a central axis parallel to the central axis of the optical preform. The pair of holes are formed at positions that are point-symmetric with respect to the central axis of the optical preform in a cross section perpendicular to the central axis of the optical preform. The holes are formed such that the holes do not protrude from the optical preform and the entire inner peripheral surfaces are constituted by the optical preform. A portion of each of the holes is provided in the core portion, and the remaining portion protrudes from the core portion and is provided in the first cladding portion. At least a portion of each of the pair of holes is formed across the core portion and the optical cladding portion.

Step S1*c* is a step of inserting the low-refractive-index portion preforms into the holes of the optical preform. In step S1*c*, each of the low-refractive-index portion preforms prepared in step S1*a* are inserted into a corresponding one of the pair of holes formed in the optical preform in step S1*b*. The low-refractive-index portion preforms are inserted in a state in which outer diameters of the low-refractive-index portion preforms are appropriately adjusted to inner diameters of the holes. The outer diameters of the low-refractive-index portion preforms are adjusted such that each of the low-refractive-index portion preforms is insertable into a corresponding one of the holes.

Step S1*d* is a step of forming a polarization-maintaining optical preform. In step S1*d*, the optical preform and the pair of low-refractive-index portion preforms inserted into the holes of the optical preform in step S1*c* are integrated with one another by heating. Thus, the polarization-maintaining optical preform is formed.

Step S1*e* is a step of forming a hole into the second cladding preform. In step S1*e*, at least one hole for inserting a polarization-maintaining optical preform is formed in the second cladding preform prepared in step S1*a*. The hole has a cylindrical shape and has a central axis parallel to a predetermined axis (e.g., central axis) of the second cladding preform. The hole is formed such that the hole does not protrude from the second cladding preform and the entire inner peripheral surface is constituted by the second cladding preform.

Step S1*f* is a step of inserting the polarization-maintaining optical preform into the hole of the second cladding preform. In step S1*f*, each of the polarization-maintaining optical preforms formed in step S1*d* is inserted into a corresponding one of the holes formed in the second cladding preform in step S1*e*. The polarization-maintaining optical preforms are inserted in a state where outer diameters of the polarization-maintaining optical preforms are appropriately adjusted to match inner diameters of the holes. The outer diameters of the polarization-maintaining optical preforms are adjusted such that each of the polarization-maintaining optical preforms is insertable into a corresponding one of the holes.

Step S1*g* is a step of forming a polarization-maintaining optical fiber preform. In step S1*g*, the second cladding preform and the polarization-maintaining optical preforms inserted into the holes of the second cladding preform in step S1*f* are integrated with one another by heating. As a result, the second cladding portion made of the second cladding preform is formed around the core portion and the first cladding portion that are made of the optical preform. In the second cladding portion, an outer periphery has translational symmetry along a predetermined axis over a predetermined length. The second cladding portion has, for example, cylindrical symmetry. It can be said that the manufacturing method according to the first embodiment includes a step of forming a second cladding portion that is made of glass and has a thermal expansion coefficient that differs by $5\times10^{-2}$/K or less from a thermal expansion coefficient of the core portion of the optical preform around the polarization-maintaining optical preform. The step of forming the second cladding portion includes step S1*a*, step S1*e*, step S1*f*, and step S1*g*. As a result, a polarization-maintaining optical fiber preform is formed. The second cladding portion may be provided by other methods known in the art. For example, the second cladding portion may be provided by forming a glass soot body in which glass particles are deposited around the first cladding portion, and then sintering the glass soot body to make it transparent.

Step S1*h* is a step of spinning a polarization-maintaining optical fiber preform. In step S1*h*, the polarization-maintaining optical fiber preform integrated by heating in step S1*g* is heated to melt and drawn in such a manner as to be spun as polarization-maintaining optical fiber 1.

As described above, polarization-maintaining optical fiber 1 can be manufactured.

Figure 19:
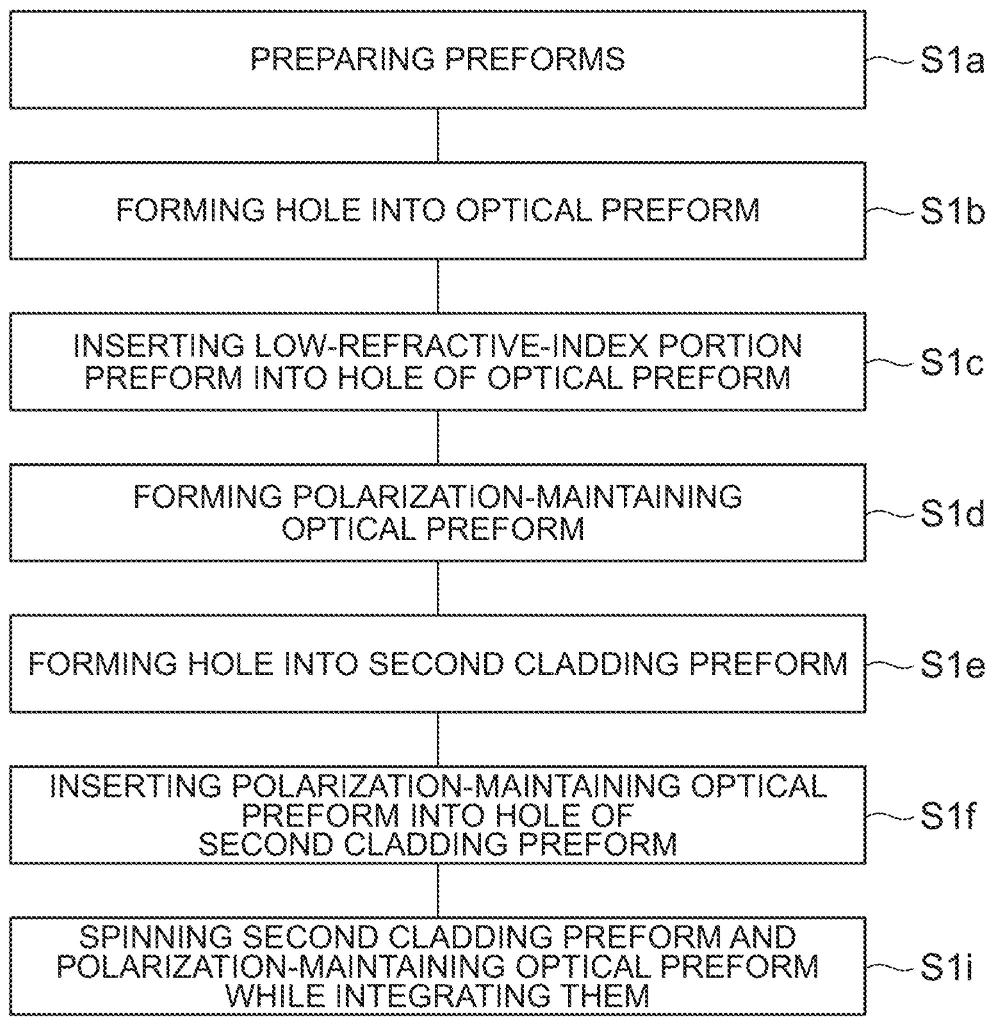
FIG. 19 is a flowchart illustrating a manufacturing method according to a modification of the first embodiment.

Next, a modification of the first embodiment will be described. FIG. 19 is a flowchart illustrating a manufacturing method according to a modification of the first embodiment. As illustrated in FIG. 19, the manufacturing method according to this modification differs from the manufacturing method according to the first embodiment in that one end of each of holes formed in the second cladding preform is sealed and each of polarization-maintaining optical preforms is inserted into a corresponding one of the holes from the opened other end in step S1*f*, and a step S1*i* is included instead of steps S1*g* and S1*h*.

Step S1*i* is a step of spinning the second cladding preform and the polarization-maintaining optical preform while integrating the second cladding preform and the polarization-maintaining optical preform with each other. In step S1*i*, the second cladding preform and the polarization-maintaining optical preforms inserted into the holes of the second cladding preform are heated to melt and drawn. As a result, the second cladding preform and the polarization-maintaining optical preform can be spun as a polarization-maintaining optical fiber while being integrated with each other.

Other modifications of the first embodiment will be described. A method according to this modification differs from the manufacturing method according to the first embodiment in that instead of forming a second cladding portion using a second cladding preform, the second cladding portion is formed from a porous cladding base layer deposited around a polarization-maintaining optical preform. The cladding base layer is formed by depositing glass particles by chemical synthesis around a single polarization-maintaining optical preform or around a plurality of polarization-maintaining optical preforms whose central axes are arranged parallel to each other. The second cladding portion is formed by making the cladding base layer transparent by sintering. At this time, after the cladding base layer is formed over the entire length of the polarization-maintaining optical preform, the second cladding portion may be formed by sintering. Formation and sintering of the cladding base layer on a portion of the polarization maintaining core preform in a longitudinal direction may be repeated at different positions in the longitudinal direction of the polarization-maintaining optical preform to form the second cladding portion over the entire length of the polarization-maintaining optical preform.

When the second cladding portion is formed, a cladding mold that is made of glass and serves as a model of an outer shape of the second cladding portion may be used. First, a cladding mold is provided around one or more polarization-maintaining optical preforms, and sand-like glass particles are filled between the cladding mold and the polarization-maintaining optical preforms. Subsequently, the cladding mold, the glass particles and the polarization-maintaining optical preform are integrated with one another by heating. Thus, a polarization-maintaining optical fiber preform having a second cladding portion is formed.

Using a cladding mold, a slurry in which glass particles are dispersed may be filled between the cladding mold and a polarization-maintaining optical preform, instead of the sand-like glass particles. The liquid in the slurry is evaporated to form a porous cladding base layer. The second cladding portion is formed by making the cladding base layer transparent by sintering.

Figure 20:
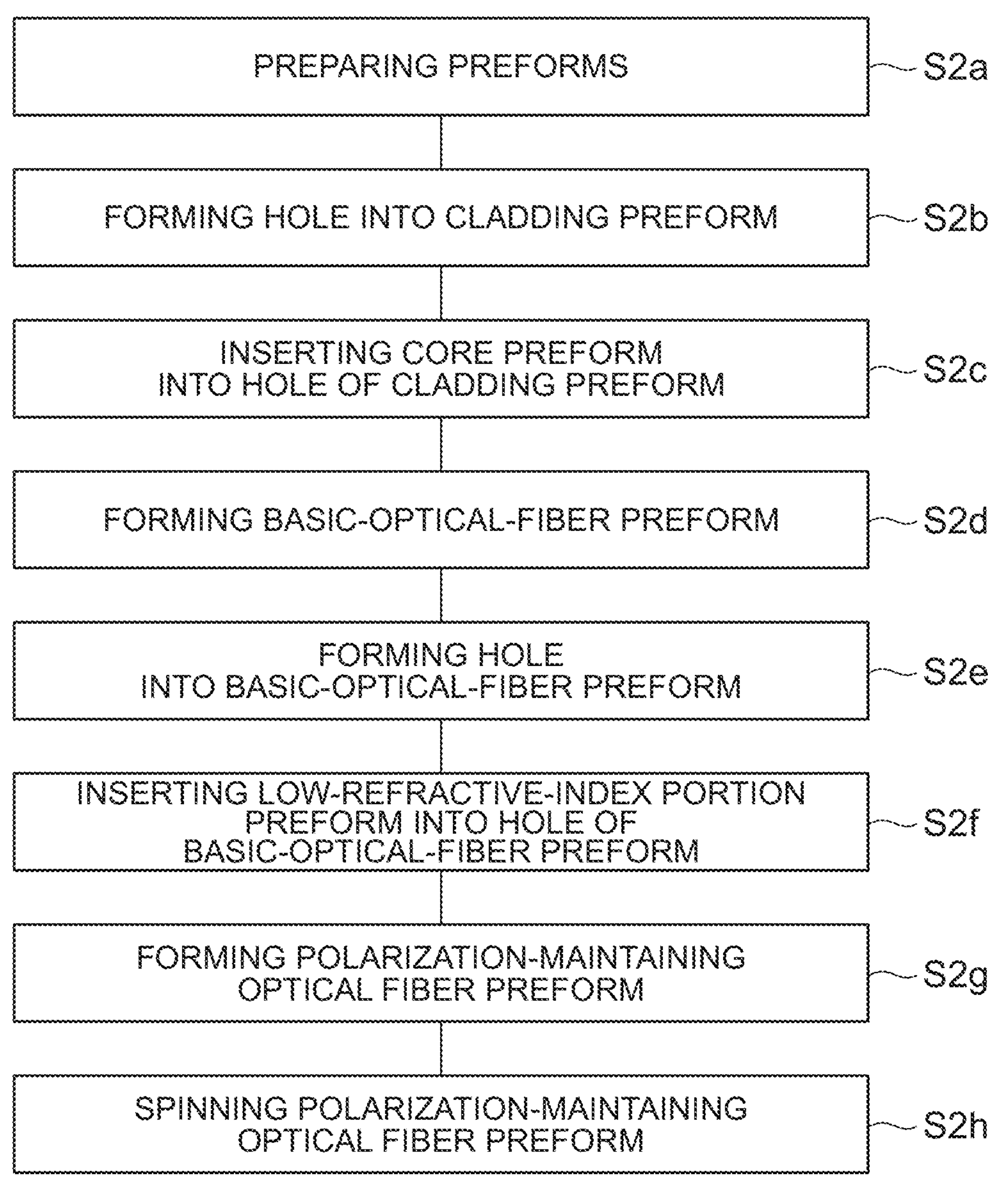
FIG. 20 is a flowchart illustrating a manufacturing method according to a second embodiment.

Next, a manufacturing method according to a second embodiment will be described. FIG. 20 is a flowchart illustrating a manufacturing method according to the second embodiment. In the manufacturing method according to the first embodiment, the optical preform and the low-refractive-index portion preforms are integrated to form the polarization-maintaining optical preform, and then the second cladding portion is provided. The manufacturing method according to the second embodiment differs from the manufacturing method according to the first embodiment in that a basic-optical-fiber preform in which an optical preform and a second cladding preform are integrated with each other in advance is used and then low-refractive-index portion preforms are provided in the basic-optical-fiber preform. As illustrated in FIG. 20, specifically, the manufacturing method according to the second embodiment includes a step S2*a*, a step S2*b*, a step S2*c*, a step S2*d*, a step S2*e*, a step S2*f*, a step S2*g*, and a step S2*h*. The manufacturing method of the second embodiment allows manufacture of all polarization-maintaining optical fibers such as polarization-maintaining optical fiber 1 and the like.

Step S2*a* is a step of preparing a core preform, a cladding preform, and a low-refractive-index portion preform. The cladding preform is prepared through, for example, a step of preparing a first cladding preform and a second cladding preform, a step of forming a hole for inserting the first cladding preform into the second cladding preform, a step of inserting the first cladding preform into the hole, and a step of integrating the first cladding preform and the second cladding preform with each other by heating. In the cladding preform, an outer periphery has translational symmetry along a predetermined axis over a predetermined length. The cladding preform has, for example, cylindrical symmetry.

Step S2*b* is a step of forming a hole into the cladding preform. In step S2*b*, at least one hole for inserting the core preform is formed into the cladding preform prepared in step S2*a*. The hole has a cylindrical shape and has a central axis that is parallel to a predetermined axis (e.g., central axis) of the cladding preform. The hole is formed such that the hole does not protrude from the cladding preform and the entire inner peripheral surface is constituted by the cladding preform.

Step S2*c* is a step of inserting the core preforms into the holes of the cladding preform. In step S2*c*, each of the core preforms prepared in step S2*a* are inserted into a corresponding one of the holes formed in the cladding preform in step S2*b*. The core preforms are inserted in a state where outer diameters of the core preforms are appropriately adjusted to match inner diameters of the holes. The outer diameters of the core preforms are adjusted such that each of the core preforms is insertable into a corresponding one of the holes. The predetermined axis (e.g., central axis) of the cladding preform and the central axes of core preforms are parallel to each other.

Step S2*d* is a step of forming a basic-optical-fiber preform. In step S2*d*, the cladding preform and at least one core preform inserted into the hole of the cladding preform in step S2*c* are integrated with each other by heating. Thus, a basic-optical-fiber preform in which the at least one core preform is included in the cladding preform is formed. The basic-optical-fiber preform has a core portion formed of the core preform and a cladding portion formed of the cladding preform. Thus, the basic-optical-fiber preform is prepared. That is, the manufacturing method according to the second embodiment includes a step of preparing a basic-optical-fiber preform. The step of preparing a basic-optical-fiber preform includes step S2*a*, step S2*b*, step S2*c*, and step S2*d*.

Step S2*e* is a step of forming holes in the basic-optical-fiber preform. In step S2*e*, a pair of holes for inserting low-refractive-index portion preforms are formed for each of core portions into the basic-optical-fiber preform formed in step S2*d*. Each of the holes has a cylindrical shape and has a central axis parallel to a central axis of a corresponding one of the core portions. The pair of holes are formed at positions that have point symmetry with respect to a central axis of a corresponding one of the core portions in a cross section perpendicular to the central axis of the corresponding core portion. The pair of holes are formed in the basic-optical-fiber preform such that at least a portion of each of the holes is formed in the core portion.

Step S2*f* is a step of inserting low-refractive-index portion preforms into the holes of the basic-optical-fiber preform. In step S2*f*, each of the low-refractive-index portion preforms prepared in step S2*a* is inserted into a corresponding one of the holes formed in the basic-optical-fiber preform in step S2*e*. The low-refractive-index portion preforms are inserted in a state where outer diameters of the low-refractive-index portion preforms are appropriately adjusted to inner diameters of the holes. The outer diameters of the low-refractive-index portion preforms are adjusted such that each of the low-refractive-index portion preforms is insertable into a corresponding one of the holes.

Step S2*g* is a step of forming a polarization-maintaining optical fiber preform. In step S2*g*, the basic-optical-fiber preform and the low-refractive-index portion preforms inserted into the holes of the basic-optical-fiber preform in step S2*f* are integrated with one another by heating. Thus, a polarization-maintaining optical fiber preform is formed.

Step S2*h* is the same as step S1*h*.

Polarization-maintaining optical fiber 1 and the like are manufactured through the above steps.

Figure 21:
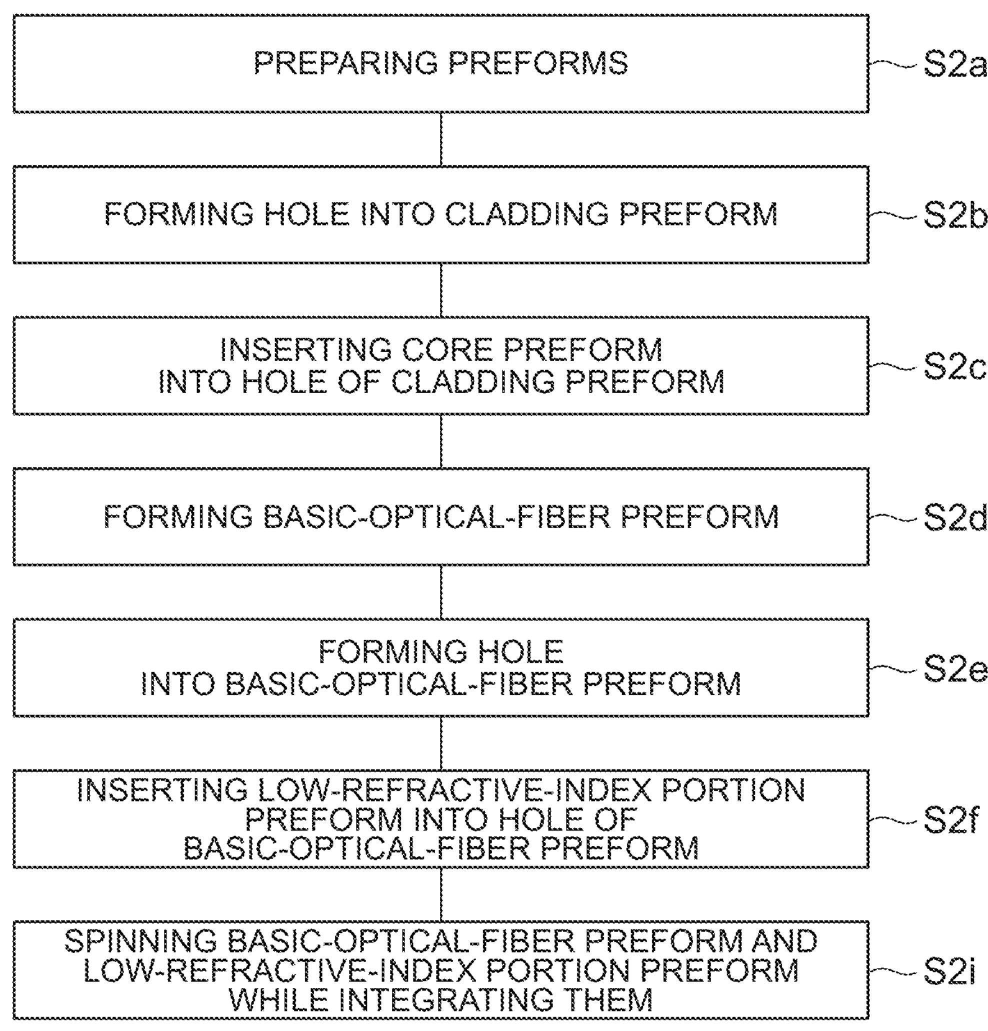
FIG. 21 is a flowchart illustrating a manufacturing method according to a modification of the second embodiment.

Next, a manufacturing method according to a modification of the second embodiment will be described. FIG. 21 is a flowchart illustrating a manufacturing method according to a modification of the second embodiment. As illustrated in FIG. 21, the manufacturing method according to this modification differs from the manufacturing method according to the first embodiment in that one end of each of the holes formed in the basic-optical-fiber preform is sealed and each of low-refractive-index portion preforms is inserted into a corresponding one of the holes from the opened other end in step S2*f*, and a step S2*i* is included instead of step S2*g* and step S2*h*.

Step S2*i* is a step of spinning the basic-optical-fiber preform and the low-refractive-index portion preforms while integrating the basic-optical-fiber preform and the low-refractive-index portion preforms with each other. In step S2*i*, the basic-optical-fiber preform and the low-refractive-index portion preforms inserted into the holes of the basic-optical-fiber preform are heated to melt and drawn by heating. As a result, the basic-optical-fiber preform and the low-refractive-index portion preforms can be spun as a polarization-maintaining optical fiber while being integrated with one another.

As described above, in polarization-maintaining optical fiber 1 and the like, polarization maintaining core 50 includes core 10 and a pair of low-refractive-index portions 40, and the pair of low-refractive-index portions 40 are point-symmetrically arranged with respect to central axis 10*c* of core 10. As a result, polarization maintaining core 50 has an asymmetric refractive index distribution and exhibits polarization maintaining performance. In the cross section, the outer peripheral surface of core 10 has a circular shape except for low-refractive-index portions 40. Unlike a case of a non-circular core, this eliminates a need to perform processing of an outer diameter of a non-circular glass, formation of a non-circular hole, and the like. Therefore, it is easy to manufacture and excellent in mass productivity. In addition, it is possible to suppress a connection loss with an ordinary optical fiber having a circular core that does not have polarization maintaining performance. Since core 10 has a circular shape, it is easy to control the roundness of the outer peripheral surface of cladding 20. It is also easy to control the shape and size of core 10.

In polarization-maintaining optical fiber 1 and the like, no SAP is provided inside core 10 and cladding 20. In addition, the difference in thermal expansion coefficient between low-refractive-index portions 40 and core 10 is $5\times10^{-7}$/K or less, $2\times10^{-7}$/K or less, or $1\times10^{-7}$/K or less. Therefore, the optical fiber preform is prevented from being broken or ruptured due to a difference in thermal expansion coefficient. Therefore, it is easy to manufacture and productivity is improved. When the length is 10 cm to 1 m, 1 m to 5 m, or 5 m to 10 m, the polarization crosstalk is −5.98 dB or less at any wavelength within a range of 850 nm to 1625 nm. Therefore, it has sufficient polarization maintaining performance for short-distance applications. In polarization-maintaining optical fiber 1 and the like, even when the length is 10 cm to 1 m, 1 m to 5 m, or 5 m to 10 m, the polarization extinction ratio of 10 dB or more can be achieved.

In the method of manufacturing polarization-maintaining optical fiber 1 and the like according to the first embodiment and the second embodiment, since the optical preform having cylindrical symmetry is used, it is possible to suppress a connection loss with an ordinary optical fiber. Each of the low-refractive-index portion preforms are inserted into a corresponding one of a pair of holes that have point symmetry with respect to the central axis of the optical preform and each have a central axis parallel to the central axis of the optical preform. Thus, a polarization maintaining core having an asymmetric refractive index distribution and exhibiting polarization maintaining performance is formed. The low-refractive-index portion preforms have the thermal expansion coefficient that differs from the thermal expansion coefficient of the optical preform by $5\times10^{-7}$/K or less, $2\times10^{-7}$/K or less, or $1\times10^{-7}$/K or less. Therefore, the optical fiber preform is prevented from being broken or ruptured due to a difference in thermal expansion coefficient. Therefore, it is easy to manufacture.

In the method of manufacturing polarization-maintaining optical fiber 1 and the like according to the second embodiment, since the basic-optical-fiber preform having a core portion that has cylindrical symmetry is used, it is possible to suppress a connection loss with an ordinary optical fiber. Each of the low-refractive-index portion preforms is inserted into a corresponding one of a pair of holes that have point symmetry with respect to the central axis of the core and each have a central axis parallel to the central axis of the optical preform. Thus, a polarization maintaining core having an asymmetric refractive index distribution and exhibiting polarization maintaining performance is formed. The low-refractive-index portion preforms have the thermal expansion coefficient that differs from the thermal expansion coefficient of the optical preform by $5\times10^{-7}$/K or less, $2\times10^{-7}$/K or less, or $1\times10^{-7}$/K or less. Therefore, the optical fiber preform is prevented from being broken or ruptured due to a difference in thermal expansion coefficient. Therefore, it is easy to manufacture.

The present disclosure is not limited to the above embodiments and modifications. The above embodiments and modifications may be combined as appropriate.

REFERENCE SIGNS LIST

1, 1A, 1B, 1C, 1D, 1E, 1F, 1G, 1H, 1I, 1J, 101, 102, 103, 104 polarization-maintaining optical fiber
10 core
10c central axis
20 cladding
20c central axis
21 first cladding
22 second cladding
30 SAP
40 low-refractive-index portion
40c central axis
50 polarization maintaining core
r10 radius
r40 radius
d distance
L1, L2, L3, L4 straight line

The invention claimed is:

1. A polarization-maintaining optical fiber comprising:
at least one polarization maintaining core;
an optical cladding surrounding the at least one polarization maintaining core; and
a common physical cladding surrounding the optical cladding,
wherein the at least one polarization maintaining core includes a core made of glass and a pair of low-refractive-index portions each having a refractive index lower than a refractive index of the core,
wherein a refractive index of the optical cladding is lower than the refractive index of the core,
wherein a refractive index of the common physical cladding is lower than the refractive index of the core,
wherein in a cross section perpendicular to a longitudinal direction of the polarization-maintaining optical fiber, at least a portion of an outer periphery of each of the pair of low-refractive-index portions is in contact with the core and an outer periphery of the core, excluding portions each being in contact with the low-refractive-index portions, has a circular shape,
wherein any one of conditions below holds:
a maximum value of an absolute value of a residual stress in the cross section is 100 MPa or less,
a difference in thermal expansion coefficient between glasses contained in components of the polarization-maintaining optical fiber is $5\times10^{-7}$/K or less, and
the glasses contained in the components of the polarization-maintaining optical fiber are each silica glass containing $B_2O_3$ whose concentration is 1% or less or 0% in terms of mass fraction,
wherein a mode-field flattening f defined by equations below is 0.05 to 0.40 at any wavelength within a range of 850 nm to 1625 nm, $$f = 1 - \frac{\min(D4\sigma_X, D4\sigma_Y)}{\max(D4\sigma_X, D4\sigma_Y)} \quad \text{[Math. 1]}$$

$$D4\sigma_X = 4\sqrt{\frac{\int\int I(X, Y)(X-\overline{X})^2 dXdY}{\int\int I(X, Y)dXdY}}$$

$$D4\sigma_Y = 4\sqrt{\frac{\int\int I(X, Y)(Y-\overline{Y})^2 dXdY}{\int\int I(X, Y)dXdY}}$$

$$\overline{X} = \frac{\int\int I(X, Y)XdXdY}{\int\int I(X, Y)dXdY}$$

$$\overline{Y} = \frac{\int\int I(X, Y)YdXdY}{\int\int I(X, Y)dXdY}$$

where a near-field intensity distribution described by a local coordinate system of the at least one polarization maintaining core is I (X, Y) in the cross section, an X axis of the local coordinate system being an axis parallel to a straight line that connects centers of the pair of low-refractive-index portions to each other and passing through an origin corresponding to a center of the at least one polarization maintaining core, and a Y axis of the local coordinate system being an axis perpendicular to the X axis and passing through the origin,
wherein inequalities below are satisfied:
0.8≤r40/r10≤2.0,
0.2≤(d−r40)/r10≤0.6,
0.5% ≤Δ10-Δ40≤2.0%, and
0.5% ≤Δ10-Δ21≤2.0%,
where r10 is a radius of the core, r40 is a radius of each of the low-refractive-index portions, and r21 is a radius of the optical cladding,
where Δ10 is a relative refractive index difference of the core, Δ40 is a relative refractive index difference of each of the low-refractive-index portions, and Δ21 is a relative refractive index difference of the optical cladding, with the refractive index of the common physical cladding used as a reference, and
where d is a distance between a central axis of the at least one polarization maintaining core and a central axis of each of the low-refractive-index portions.

2. The polarization-maintaining optical fiber according to claim 1,
wherein, in the cross section, any one or more of first to fifth conditions are satisfied,
the first condition being that the outer periphery of each of the pair of low-refractive-index portions has a circular shape,
the second condition being that the pair of low-refractive-index portions are point-symmetrically arranged with respect to a central axis of the at least one polarization maintaining core,
the third condition being that a refractive index distribution of the at least one polarization maintaining core, excluding the low-refractive-index portions, is axisymmetric with respect to a central axis of the at least one polarization maintaining core, the fourth condition being that portions of the outer periphery of each of the pair of low-refractive-index portions that is not in contact with the at least one polarization maintaining core are in contact with the optical cladding, and the fifth condition being that the pair of low-refractive-index portions are each made of glass, and a difference between a thermal expansion coefficient of the glass contained in the low-refractive-index portions constituting the polarization-maintaining optical fiber and a thermal expansion coefficient of the glass contained in the other portions constituting the polarization-maintaining optical fiber is $5\times10^{-7}$/K or less, or a concentration of $B_2O_3$ contained in the glass of the low-refractive-index portions is 1% or less or 0% in terms of mass fraction.

3. The polarization-maintaining optical fiber according to claim 1, wherein the at least one polarization maintaining core includes a plurality of polarization maintaining cores.

4. The polarization-maintaining optical fiber according to claim 3, wherein the plurality of polarization maintaining cores are arranged in such a manner as to have two or more-fold rotational symmetry with respect to a central axis of the common physical cladding in the cross section.

5. The polarization-maintaining optical fiber according to claim 3, wherein, in the cross section, the plurality of polarization maintaining cores have polarization maintaining direction perpendicular to a straight line that connects central axes of the pair of low-refractive-index portions to each other and passing through central axes of the plurality of polarization maintaining cores and are arranged in such a manner that positions and the polarization maintaining directions of the plurality of polarization maintaining cores have two or more-fold rotational symmetry with respect to a central axis of the common physical cladding.

6. The polarization-maintaining optical fiber according to claim 3, wherein, in the cross section, the plurality of polarization maintaining cores have polarization maintaining directions perpendicular to a straight line that connects central axes of the pair of low-refractive-index portions to each other and passing through central axes of the plurality of polarization maintaining cores and are arranged such that all the polarization maintaining directions are parallel to each other.

7. The polarization-maintaining optical fiber according to claim 3, wherein, in the cross section, the plurality of polarization maintaining cores have polarization maintaining directions perpendicular to a straight line that connects central axes of the pair of low-refractive-index portions to each other and passing through central axes of the plurality of polarization maintaining cores and are arranged in such a manner that positions and the polarization maintaining directions of the plurality of polarization maintaining cores have line symmetry with respect to a straight line passing through a central axis of the common physical cladding.

8. The polarization-maintaining optical fiber according to claim 1, wherein a first condition or a second condition expressed by inequalities below is satisfied, First condition:

3 μm≤r10≤6 μm 2.5≤r21/r10≤3.6

0.70% ≤3 Δ10-Δ40≤0.85%

0.70% ≤3 Δ10-Δ21≤0.85%

0.40% ≤3 Δ10≤0.63%

Δ21≤0%

Δ40≤0%

Second condition:

3 μm≤r10≤6 μm 2.5≤r21/r10≤3.7

0.50% ≤3 Δ10-Δ40≤0.65%

0.50% ≤3 Δ10-Δ21≤0.85%

0.40% ≤3 Δ10≤0.53%

Δ21≤0%

Δ40≤0%.

9. The polarization-maintaining optical fiber according to claim 1, wherein a mode-field average diameter defined by an equation below is 3 μm to 12 μm at a wavelength of 1310 nm.

$$MFD_{avg} = \sqrt{\frac{D4\sigma_X^2 + D4\sigma_Y^2}{2}}$$ [Math. 2]

10. The polarization-maintaining optical fiber according to claim 1, wherein a birefringence is $5\times10^{-6}$ to $5\times10^{-5}$ at any wavelength within the range of 850 nm to 1625 nm.

11. The polarization-maintaining optical fiber according to claim 1, wherein, when a length of the polarization-maintaining optical fiber in the longitudinal direction is 10 cm to 10 m, a polarization crosstalk is −26.4 dB or more at any wavelength within the range of 850 nm to 1625 nm.

12. The polarization-maintaining optical fiber according to claim 1, wherein, when a length of the polarization-maintaining optical fiber in the longitudinal direction is 10 cm to 10 m, a polarization crosstalk is −7.2 dB or less at any wavelength within the range of 850 nm to 1625 nm.

13. The polarization-maintaining optical fiber according to claim 1, wherein, in the cross section, the at least one polarization maintaining core has a polarization maintaining direction perpendicular to a straight line that connects central axes of the pair of low-refractive-index portions to each other and passing through a central axis of the at least one polarization maintaining core, and wherein the polarization-maintaining optical fiber is bent at a radius of 10 mm or less and is fixed to a holding member such that a bending radius direction and the polarization maintaining direction are perpendicular to each other or parallel to each other in the cross section.

14. A method of manufacturing a polarization-maintaining optical fiber including at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding, wherein inequalities below are satisfied:

0.8≤r40/r10≤2.0.

0.2≤(d−r40)/r10≤0.6.

0.5% ≤Δ10-Δ40≤2.0%, and $0.5\% \leq \Delta 10 - \Delta 21 \leq 2.0\%$, where r10 is a radius of the core, r40 is a radius of each of the low-refractive-index portions, and r21 is a radius of the optical cladding, where Δ10 is a relative refractive index difference of the core, A40 is a relative refractive index difference of each of the low-refractive-index portions, and A21 is a relative refractive index difference of the optical cladding, with the refractive index of the common physical cladding used as a reference, and where d is a distance between a central axis of the at least one polarization maintaining core and a central axis of each of the low-refractive-index portions, the method comprising:

preparing an optical preform made of glass and having cylindrical symmetry, the optical preform including a core portion and an optical cladding portion;

preparing low-refractive-index-portion preforms each made of glass and each having cylindrical symmetry, the low-refractive-index-portion preforms each having a thermal expansion coefficient that differs by $5\times10^{-7}$/K or less from a thermal expansion coefficient of the core portion;

forming a pair of holes each having a cylindrical shape into the optical preform such that the pair of holes are point-symmetrically arranged with respect to a central axis of the optical preform in a cross section perpendicular to the central axis of the optical preform and have central axes parallel to the central axis of the optical preform;

inserting each of the low-refractive-index-portion preforms into a corresponding one of the pair of holes of the optical preform and integrating the low-refractive-index-portion preforms with the optical preform by heating the low-refractive-index-portion preforms and the optical preform in such a manner as to form at least one polarization-maintaining optical preform corresponding to the at least one polarization maintaining core; and spinning the at least one polarization-maintaining optical preform by drawing the at least one polarization-maintaining optical preform after or while providing a common physical cladding portion around the at least one polarization-maintaining optical preform.

15. The method of manufacturing a polarization-maintaining optical fiber according to claim 14, wherein a polarization-maintaining-optical-fiber preform is formed by providing a common physical cladding portion around the at least one polarization-maintaining optical preform, the common physical cladding portion being made of glass and having a thermal expansion coefficient that differs by $5\times10^{-7}$/K or less from the thermal expansion coefficient of the core portion, and wherein the polarization-maintaining-optical-fiber preform is heated to melt and drawn in such a manner as to be spun as the polarization-maintaining optical fiber.

16. The method of manufacturing a polarization-maintaining optical fiber according to claim 15, wherein the forming the polarization-maintaining-optical-fiber preform includes:

preparing a physical-cladding preform made of glass and having a thermal expansion coefficient that differs by $5\times10^{-7}$/K or less from the thermal expansion coefficient of the core portion, an outer periphery of the physical-cladding preform having translational symmetry along a predetermined axis, forming at least one hole having a cylindrical shape and having a central axis parallel to the predetermined axis of the physical-cladding preform in a cross section of the physical-cladding preform perpendicular to the predetermined axis into the physical-cladding preform, inserting each of the at least one polarization-maintaining optical preform into a corresponding one of the at least one hole of the physical-cladding preform, and integrating the physical-cladding preform and the at least one polarization-maintaining optical preform, which is inserted in the physical-cladding preform, with each other by heating the physical-cladding preform and the at least one polarization-maintaining optical preform.

17. The method of manufacturing a polarization-maintaining optical fiber according to claim 14, wherein the spinning the at least one polarization-maintaining optical preform by drawing the at least one polarization-maintaining optical preform after or while providing a common physical cladding portion around the at least one polarization-maintaining optical preform includes preparing a physical-cladding preform made of glass and having a thermal expansion coefficient that differs by $5\times10^{-7}$/K or less from the thermal expansion coefficient of the core portion, an outer periphery of the physical-cladding preform having translational symmetry along a predetermined axis, forming at least one hole into the physical-cladding preform, the at least one hole having a cylindrical shape and having a central axis parallel to the predetermined axis of the physical-cladding preform in a cross section of the physical-cladding preform perpendicular to the predetermined axis, inserting each of the at least one polarization-maintaining optical preform into a corresponding one of the at least one hole of the physical-cladding preform, and integrating the physical-cladding preform and the at least one polarization-maintaining optical preform, which is inserted in the physical-cladding preform, with each other by heating the physical-cladding preform and the at least one polarization-maintaining optical preform and melting and drawing the physical-cladding preform and the at least one polarization-maintaining optical preform in such a manner as to spin the physical-cladding preform and the at least one polarization-maintaining optical preform as a polarization-maintaining optical fiber.

18. A method of manufacturing a polarization-maintaining optical fiber including at least one polarization maintaining core including a core made of glass and a pair of low-refractive-index portions each having a refractive index lower than a refractive index of the core, an optical cladding surrounding the at least one polarization maintaining core, and a common physical cladding surrounding the optical cladding, wherein inequalities below are satisfied:

$0.8 \leq r40/r10 \leq 2.0$, $0.2 \leq (d-r40)/r10 \leq 0.6$, $0.5\% \leq \Delta 10 - \Delta 40 < 2.0\%$, and $0.5\% \leq \Delta 10 - \Delta 21 \leq 2.0\%$, where r10 is a radius of the core, r40 is a radius of each of the low-refractive-index portions, and r21 is a radius of the optical cladding, where $\Delta 10$ is a relative refractive index difference of the core, $\Delta 40$ is a relative refractive index difference of each of the low-refractive-index portions, and $\Delta 21$ is a relative refractive index difference of the optical cladding, with the refractive index of the common physical cladding used as a reference, and where d is a distance between a central axis of the at least one polarization maintaining core and a central axis of each of the low-refractive-index portions, the method comprising:

preparing a basic-optical-fiber preform including a core portion made of glass and having cylindrical symmetry, an optical cladding portion surrounding the core portion and having cylindrical symmetry, the optical cladding portion made of glass and having a thermal expansion coefficient that differs by $5\times10^{-7}$/K or less from a thermal expansion coefficient of the core portion, and a common physical cladding portion surrounding the optical cladding portion and made of glass, an outer periphery of the common physical cladding portion having translational symmetry along a predetermined axis, and the common physical cladding portion having a thermal expansion coefficient that differs by $5\times10^{-7}$/K or less from the thermal expansion coefficient of the core portion, forming a pair of holes each having a cylindrical shape into the basic-optical-fiber preform, the pair of holes being point-symmetrically arranged with respect to a central axis of the core portion in a cross section perpendicular to the central axis of the core portion and having central axes parallel to the central axis of the core portion, such that at least a portion of each of the pair of holes is formed across the core portion and the optical cladding portion, preparing low-refractive-index-portion preforms each made of glass and each having cylindrical symmetry, the low-refractive-index-portion preforms each having a thermal expansion coefficient that differs by $5\times10^{-7}$/K or less from the thermal expansion coefficient of the core portion and from a thermal expansion coefficient of the common physical cladding portion, and outer diameters of the low-refractive-index-portion preforms being adjusted such that each of the low-refractive-index-portion preforms is insertable into a corresponding one of the pair of holes, and inserting each of the low-refractive-index-portion preforms into the corresponding one of the pair of holes of the basic-optical-fiber preform and spinning the low-refractive-index-portion preforms and the basic-optical-fiber preform by drawing the low-refractive-index-portion preforms and the basic-optical-fiber preform after or while integrating the low-refractive-index-portion preforms with the basic-optical-fiber preform.

19. The method of manufacturing a polarization-maintaining optical fiber according to claim 18, wherein a polarization-maintaining-optical-fiber preform is formed by heating the basic-optical-fiber preform and the low-refractive-index-portion preforms, which are inserted in the pair of holes of the basic-optical-fiber preform, such that the basic-optical-fiber preform and the low-refractive-index-portion preforms are integrated with one another, and then, the polarization-maintaining-optical-fiber preform is heated to melt and drawn in such a manner as to be spun as a polarization-maintaining optical fiber.

20. The method of manufacturing a polarization-maintaining optical fiber according to claim 18, wherein the basic-optical-fiber preform and the low-refractive-index-portion preforms, which are inserted in the pair of holes of the basic-optical-fiber preform, are heated to be integrated with one another and melted and drawn in such a manner as to be spun as a polarization-maintaining optical fiber.

21. The method of manufacturing a polarization-maintaining optical fiber according to claim 18, wherein the preparing a basic-optical-fiber preform includes preparing at least one optical preform corresponding to the at least one polarization maintaining core including the core portion and the optical cladding portion, preparing a physical-cladding preform made of glass and having a thermal expansion coefficient that differs by $5\times10^{-7}$/K or less from a thermal expansion coefficient of the at least one optical preform, an outer periphery of the physical-cladding preform having translational symmetry along a predetermined axis, forming at least one hole corresponding to the at least one polarization maintaining core into the physical-cladding preform, the at least one hole having a cylindrical shape and having a central axis parallel to the predetermined axis of the physical-cladding preform in a cross section of the physical-cladding preform perpendicular to the predetermined axis, inserting each of the at least one optical preform into a corresponding one of the at least one hole of the physical-cladding preform, and forming the basic-optical-fiber preform by heating the physical-cladding preform and the at least one optical preform, which is inserted in the physical-cladding preform, such that the physical-cladding preform and the at least one optical preform are integrated with each other.

* * * * *